United States Patent
Miyazaki et al.

(10) Patent No.: US 9,776,605 B2
(45) Date of Patent: Oct. 3, 2017

(54) VEHICLE BRAKE CONTROL DEVICE

(71) Applicants: Tetsuya Miyazaki, Toyota (JP); Kazunori Nimura, Toki (JP)

(72) Inventors: Tetsuya Miyazaki, Toyota (JP); Kazunori Nimura, Toki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/441,963

(22) PCT Filed: Nov. 16, 2012

(86) PCT No.: PCT/JP2012/079840
§ 371 (c)(1),
(2) Date: May 11, 2015

(87) PCT Pub. No.: WO2014/076820
PCT Pub. Date: May 22, 2014

(65) Prior Publication Data
US 2015/0314767 A1 Nov. 5, 2015

(51) Int. Cl.
*B60T 8/40* (2006.01)
*B60T 7/04* (2006.01)
(Continued)

(52) U.S. Cl.
CPC .......... *B60T 7/042* (2013.01); *B60T 8/4081* (2013.01); *B60T 13/142* (2013.01);
(Continued)

(58) Field of Classification Search
CPC ...... B60T 8/4081; B60T 8/441; B60T 13/145; B60T 13/686; B60T 7/042; B60T 8/38;
(Continued)

(56) References Cited

U.S. PATENT DOCUMENTS 6,126,248 A * 10/2000 Kawahata ............ B60T 8/3655
303/114.1
6,450,591 B1 * 9/2002 Kawahata ............ B60T 8/3655
303/122.05
(Continued)

FOREIGN PATENT DOCUMENTS

JP 10 287227 10/1998
JP WO 2011096039 A1 * 8/2011 ............ B60T 8/4081
JP 2012 116345 6/2012

OTHER PUBLICATIONS

International Search Report Issued Feb. 19, 2013 in PCT/JP12/079840 Filed Nov. 16, 2012.

*Primary Examiner* — Bradley King
*Assistant Examiner* — Stephen Bowes
(74) *Attorney, Agent, or Firm* — Oblon, McClelland, Maier & Neustadt, L.L.P.

(57) ABSTRACT

A brake control device includes a pilot-type pressure-increasing device. A pilot unit of the pressure-increasing device is connected to a power hydraulic pressure generating device via a pilot input passage. A linear control valve that is also used for adjusting a hydraulic pressure of a wheel cylinder is provided on the pilot input passage. A brake ECU checks whether the pressure-increasing device is normally activated or not based on a hydraulic pressure outputted from the pressure-increasing device when the linear control valve is energized for an activation check. Thus, the brake ECU can perform the activation check of the pressure-increasing device without requiring a driver's operation on a brake pedal.

8 Claims, 15 Drawing Sheets

(51) Int. Cl.
*B60T 13/14* (2006.01)
*B60T 13/66* (2006.01)
*B60T 13/68* (2006.01)
B60T 8/36 (2006.01)
B60T 8/90 (2006.01)

(52) U.S. Cl.
CPC .......... *B60T 13/146* (2013.01); *B60T 13/662* (2013.01); *B60T 13/686* (2013.01); *B60T 8/3655* (2013.01); *B60T 8/90* (2013.01)

(58) Field of Classification Search
CPC .... B60T 8/4036; B60T 8/4077; B60T 13/148; B60T 2270/402; B60T 2270/404; B60T 8/88; B60T 8/92; B60T 8/94
See application file for complete search history.

(56) References Cited

U.S. PATENT DOCUMENTS

| | | | |
|---|---|---|---|
| 6,945,610 B1* | 9/2005 | Mizutani | B60T 8/3275 303/11 |
| 2002/0101114 A1* | 8/2002 | Kamiya | B60T 8/3275 303/114.1 |
| 2012/0256477 A1* | 10/2012 | Miyazaki | B60T 8/4081 303/6.01 |

* cited by examiner

VEHICLE BRAKE CONTROL DEVICE

TECHNICAL FIELD

The present invention relates to a vehicle brake control device that adjusts a hydraulic pressure generated in a power hydraulic pressure generating device by a pressure adjusting device, and supplies the adjusted hydraulic pressure to a wheel cylinder of a wheel.

BACKGROUND ART

Conventionally, there has been known a vehicle brake control device including a power hydraulic pressure generating device generating a hydraulic pressure by driving a pressure pump; a pressure adjusting device, such as a linear control valve, adjusting the hydraulic pressure outputted from the power hydraulic pressure generating device; and an electronic control device controlling the operation of the pressure adjusting device to cause the hydraulic pressure supplied to a wheel cylinder to follow a target hydraulic pressure. In order to enable a supply of a hydraulic pressure to the wheel cylinder even if something abnormal occurs on a control system, such vehicle brake control device includes a master passage through which a hydraulic pressure of a master cylinder generated by a driver's operation on a brake pedal is supplied to the wheel cylinder.

A brake control device proposed in Patent Document 1 includes a pilot-type pressure-increasing device. A hydraulic pressure outputted from a master cylinder is inputted to a pilot unit of the pressure-increasing device. The pressure-increasing device generates a hydraulic pressure higher than the hydraulic pressure generated by the master cylinder by utilizing a hydraulic pressure outputted from a power hydraulic pressure generating device, and supplies the generated hydraulic pressure to a wheel cylinder. With this, a hydraulic pressure with a predetermined pressure-increase ratio to the hydraulic pressure from the master cylinder can be supplied to the wheel cylinder. The brake control device proposed in Patent Document 1 also includes a check device checking whether the pressure-increasing device is normally activated or not. This check device is started when a depression operation of a brake pedal is first detected after an ignition switch is changed from off to on. The check device executes an activation check of the pressure-increasing device with the brake pedal being depressed. The check device determines whether or not the pressure-increasing device is normally activated or not based on the relationship between the hydraulic pressure inputted to the pilot unit (hydraulic pressure outputted from the master cylinder) and the hydraulic pressure outputted from the pressure-increasing device.

PRIOR ART DOCUMENT

Patent Document

Patent Document 1: Japanese Patent Application Laid-Open (kokai) No. 2012-116345

SUMMARY OF THE INVENTION

However, in the brake control device proposed in Patent Document 1, a driver's depression operation on the brake pedal is required to perform the activation check of the pressure-increasing device. In addition, since force of the driver's depression operation and an operation speed are different, a hydraulic pressure from the master cylinder suitable for the activation check is not always acquired. Therefore, the brake control device in Patent Document 1 has room for improvement in accuracy of the check.

The present invention is accomplished to solve the above problem, and aims to perform an activation check of a pressure-increasing device without relying on a driver's depression operation on a brake pedal.

According to an aspect of the present invention for solving the above problem, a vehicle brake control device includes: a wheel cylinder (82) provided to each of plural wheels, and receiving a hydraulic pressure of operating fluid to apply braking force to the wheels; a pedal effort hydraulic pressure generating device (20) that generates a hydraulic pressure by a pedal effort caused by a driver's depression operation on a brake pedal; a power hydraulic pressure generating device (30) that generates a hydraulic pressure by driving an electric pressure applying device; a pressure adjusting device (44, 45, 91, 93) that adjusts a hydraulic pressure outputted from the power hydraulic pressure generating device, and supplies the adjusted hydraulic pressure to each wheel cylinder; a hydraulic control unit (100) that controls an activation of the pressure adjusting device; a pressure-increasing device (50) that is a pilot-type hydraulic controller activating without using electric energy, and includes a pilot unit receiving a hydraulic pressure outputted from the pedal effort hydraulic pressure generating device, the pressure-increasing device being capable of outputting a hydraulic pressure higher than the hydraulic pressure outputted from the pedal effort hydraulic pressure generating device by utilizing the hydraulic pressure outputted from the power hydraulic pressure generating device; a servo pressure passage (41) that is a passage for supplying a hydraulic pressure outputted from the pressure-increasing device to at least one wheel cylinder; and a check unit (100) that checks whether the pressure-increasing device is normally activated or not, the vehicle brake control device including: a check pilot pressure supply unit (44FL, 37, 96) that adjusts the hydraulic pressure outputted from the power hydraulic pressure generating device to an activation check hydraulic pressure, and supplies the activation check hydraulic pressure to the pilot unit of the pressure-increasing device, wherein the activation check unit (S11 to S22) checks whether the pressure-increasing device is normally activated or not based on the hydraulic pressure outputted from the pressure-increasing device during when the activation check hydraulic pressure is supplied to the pilot unit of the pressure-increasing device by the check pilot pressure supply unit.

The present invention includes the power hydraulic pressure generating device, the pressure adjusting device, and the hydraulic control unit, wherein the hydraulic control unit adjusts a hydraulic pressure outputted from the power hydraulic pressure generating device by controlling the pressure adjusting device, and supplies the adjusted hydraulic pressure to each wheel cylinder. For example, the hydraulic control unit detects a hydraulic pressure of the wheel cylinder, and controls the pressure adjusting device such that the detected hydraulic pressure follows a target hydraulic pressure. The present invention also includes the pedal effort hydraulic pressure generating device and the pressure-increasing device, wherein the pressure-increasing device supplies a hydraulic pressure, which is higher than the hydraulic pressure outputted from the pedal effort hydraulic pressure generating device, to at least one of the wheel cylinders via the servo pressure passage, by utilizing the hydraulic pressure outputted from the power hydraulic pressure generating device. The pressure-increasing device is a pilot-type hydraulic controller that activates without using electric energy, and that includes a pilot unit receiving a hydraulic pressure outputted from the pedal effort hydraulic pressure generating device, the pressure-increasing device adjusting the hydraulic pressure outputted from the power hydraulic pressure generating device to a hydraulic pressure with a predetermined pressure-increase ratio to the hydraulic pressure inputted to the pilot unit, and outputting the resultant hydraulic pressure.

The present invention includes the check pilot pressure supply unit and the activation check unit for checking the activation of the pressure-increasing device. The check pilot pressure supply unit adjusts the hydraulic pressure outputted from the power hydraulic pressure generating device to an activation check hydraulic pressure, and supplies the activation check hydraulic pressure to the pilot unit of the pressure-increasing device. The activation check hydraulic pressure is a pressure by which it can be determined whether the pressure-increasing device is normally activated or not. Specifically, the activation check hydraulic pressure is a pressure by which the pressure-increasing device outputs a hydraulic pressure higher than the hydraulic pressure inputted to the pilot unit, if the pressure-increasing device is normal. The activation check unit checks whether the pressure-increasing device is normally activated or not based on the hydraulic pressure outputted from the pressure-increasing device during when the activation check hydraulic pressure is supplied to the pilot unit of the pressure-increasing device. According to the present invention, the check unit can execute the activation check of the pressure-increasing device without requiring a driver's depression operation on the brake pedal. Thus, the activation check can be performed with high accuracy. In addition, a degree of freedom of a timing at which the activation check is performed is increased.

According to another aspect of the present invention, the check pilot pressure supply unit includes a power hydraulic pressure pilot input passage (37) that is a passage for supplying a hydraulic pressure from the power hydraulic pressure generating device to the pilot unit (53) of the pressure-increasing device, and a linear control valve (44FL, 96) that adjusts the hydraulic pressure outputted from the power hydraulic pressure generating device to the activation check hydraulic pressure.

In the present invention, the power hydraulic pressure generating device and the pilot unit of the pressure-increasing device are connected to each other by the power hydraulic pressure pilot input passage, and the linear control valve is provided on the power hydraulic pressure pilot input passage. The linear control valve adjusts the hydraulic pressure outputted from the power hydraulic pressure generating device to the activation check hydraulic pressure. According to the present invention, the hydraulic pressure outputted from the power hydraulic pressure generating device can accurately be adjusted to the activation check hydraulic pressure, whereby the accuracy of the activation check can further be enhanced.

According to another aspect of the present invention, the vehicle brake control device includes a bypass passage (39) that supplies a hydraulic pressure outputted from the linear control valve provided on the power hydraulic pressure pilot input passage to the servo passage by bypassing the pressure-increasing device; and an activation restriction unit (48) that brings the pressure-increasing device into a disabled state, wherein the hydraulic control unit controls the linear control valve provided on the power hydraulic pressure pilot input passage to supply the hydraulic pressure adjusted by the linear control valve to at least one of the wheel cylinders via the bypass passage or the servo pressure passage, when the pressure-increasing device is in the disabled state.

The present invention includes the bypass passage and the activation restriction passage. The bypass passage forms a passage for supplying a hydraulic pressure outputted from the linear control valve to the servo passage by bypassing the pressure-increasing device. The activation restriction unit brings the pressure-increasing device into a disabled state. The activation restriction unit prevents the hydraulic pressure outputted from the power hydraulic pressure generating device from being supplied to the pressure-increasing device. When the pressure-increasing device is in the disabled state, the hydraulic control unit controls the linear control valve provided on the power hydraulic pressure pilot input passage to supply the hydraulic pressure adjusted by the linear control valve to at least one of the wheel cylinders via the bypass passage or the servo pressure passage. With this configuration, the linear control valve can control the hydraulic pressure of at least one wheel cylinder. According to the present invention, the linear control valve provided on the power hydraulic pressure pilot input passage can also be used as at least a part of the pressure adjusting device with low cost.

According to another aspect of the present invention, the servo passage joins a downstream passage of the pressure adjusting device.

In the present invention, the servo passage joins a downstream passage of the pressure adjusting device. In other words, the servo pressure passage joins the passage that supplies a hydraulic pressure to the wheel cylinder from the pressure adjusting device. In this case, the servo pressure passage may join the downstream passage of the pressure adjusting device via a control valve. With this configuration, in the present invention, the activation of the pressure adjusting device can be assisted by using the linear control valve (linear control valve provided on the power hydraulic pressure pilot input passage) for the activation check. Even if the pressure adjusting device is in failure, the hydraulic pressure of the wheel cylinder can be controlled by using the linear control valve for the activation check in place of the failed pressure adjusting device, for example. In this case, the vehicle brake control device may include an abnormality detecting unit that detects abnormality of the pressure adjusting device, wherein the hydraulic control unit may control the hydraulic pressure supplied to the wheel cylinder by using the linear control valve for the activation check in place of the pressure adjusting device, when the abnormality detecting unit detects abnormality of the pressure adjusting device. This configuration can enhance capability to cope with failure.

For example, the vehicle brake control device may be configured such that the hydraulic control unit alternately activates the pressure adjusting device and the activation check linear control valve to control the hydraulic pressure of the wheel cylinder. In this case, the activation time of the pressure adjusting device can be shortened, whereby the life of the pressure-increasing device can be increased. For example, the vehicle brake control device may be configured such that the hydraulic control unit simultaneously activates the pressure adjusting device and the activation check linear control valve to control the hydraulic pressure of the wheel cylinder. In this case, a flow rate of the operating fluid to be flown can be increased.

According to another aspect of the present invention, a wheel cylinder (82FL) of one of the left and right front wheels and a wheel cylinder (82RL) of the other of the left and right front wheels communicate with each other via a normally opened on-off valve (46, 94FL, 94FR) that is closed when its solenoid is energized, and that keeps opened when its solenoid is not energized, and the servo pressure passage supplies a hydraulic pressure to the wheel cylinder of one of the left and right front wheels.

In the present invention, the wheel cylinders of the left and right front wheels communicate with each other via the normally opened on-off valve, and the servo pressure passage supplies a hydraulic pressure to the wheel cylinder of one of the left and right front wheels. With this configuration, when something abnormal occurs on a control system, the hydraulic pressure outputted from the pressure-increasing device can be supplied to the wheel cylinders of the left and right front wheels largely contributing to braking. The hydraulic pressure supply paths to the wheel cylinders of the left and right front wheels can be separated by closing the normally opened on-off valve. Therefore, during the hydraulic control, or when abnormal leakage of operating fluid is detected, an appropriate flow path (hydraulic path) of the operating fluid can be formed.

In the above description, the reference numerals used in the embodiments are added in parentheses to the respective corresponding components in the embodiments, in order to facilitate understanding of the present invention. However, the respective constituents of the present invention are not intended to be limited to the components specified by the reference numerals in the embodiments.

BEST MODE FOR CARRYING OUT THE INVENTION

Figure 1:
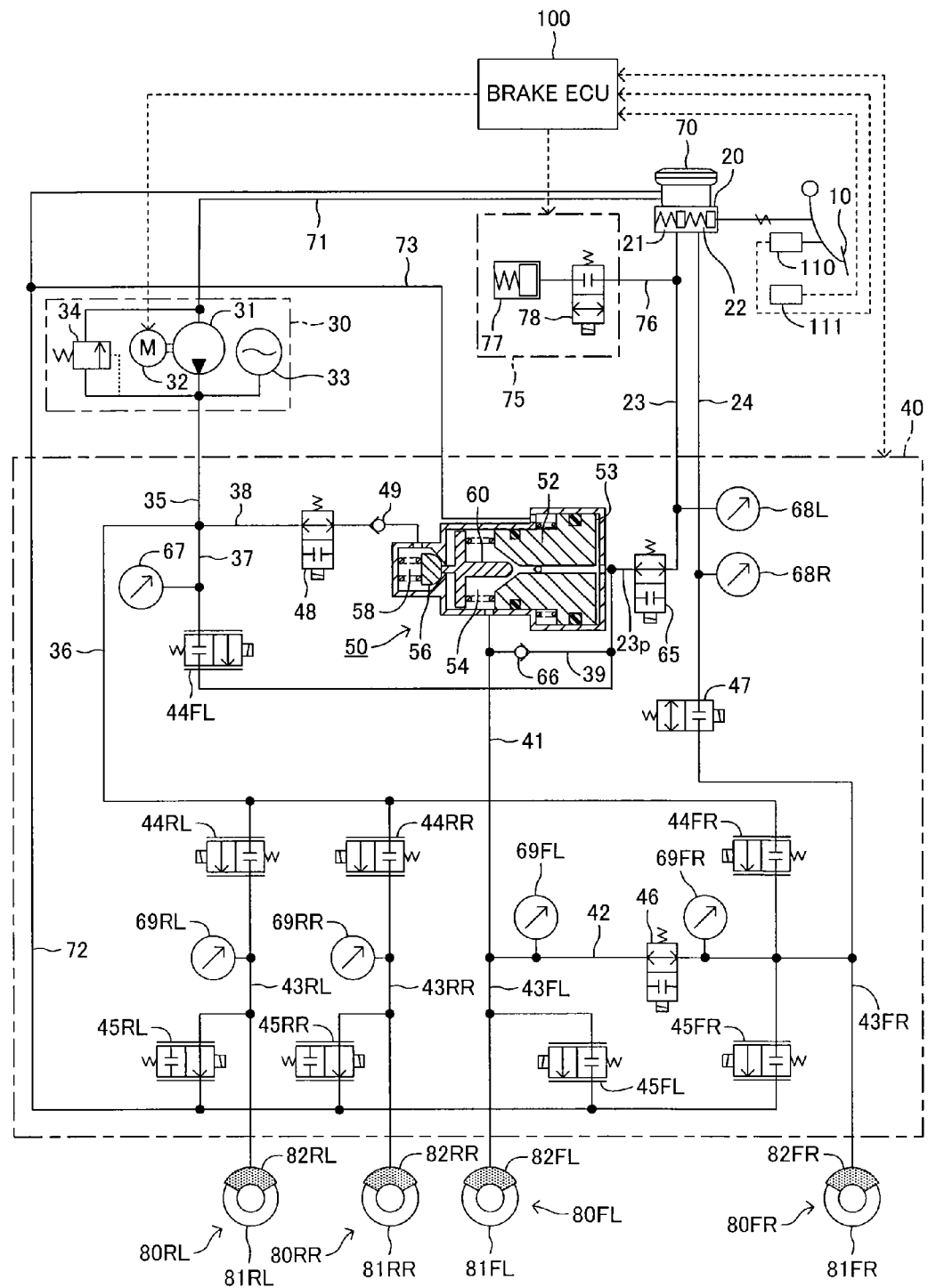
FIG. 1 is a diagram illustrating a schematic system configuration of a vehicle brake control device according to a first embodiment of the present invention.

A vehicle brake control device according to embodiments of the present invention will be described below with reference to the accompanying drawings. FIG. 1 is a diagram illustrating a schematic system configuration of a vehicle brake control device according to a first embodiment.

The brake control device according to the present embodiment includes a brake pedal 10, a master cylinder 20, a power hydraulic pressure generating device 30, a brake actuator 40, a reservoir 70, a stroke simulator device 75, disk brake units 80FL, 80FR, 8ORL, and 8ORR, each of which is provided to each wheel, and a brake ECU 100 serving as an electronic control device performing a brake control.

The disk brake units 80FL, 80FR, 8ORL, and 8ORR respectively include brake disks 81FL, 81FR, 81RL, and 81RR, and wheel cylinders 82FL, 82FR, 82RL, and 82RR incorporated in brake calipers. The wheel cylinders 82FL, 82FR, 82RL, and 82RR are connected to the brake actuator 40, and they press a brake pad against the brake disks 81FL, 81FR, 81RL, and 81RR, which rotate with wheels, by a hydraulic pressure of operating fluid (brake fluid) supplied from the brake actuator 40 to apply braking force to the wheels.

The components provided for each wheel are represented such that FL for the front-left wheel, FR for the front-right wheel, RL for the rear-left wheel, and RR for the rear-right wheel are written at the end of the corresponding reference numeral. However, the reference symbols at the end are omitted, when it is unnecessary to specify any one of the components for the front-left, front-right, rear-left, and rear-right wheels.

The master cylinder 20 includes a first pressure chamber 21 and a second pressure chamber 22. When the brake pedal 10 is depressed, a pressure piston in the master cylinder 20 advances forward to increase the pressure of the operating fluid, and the master cylinder 20 generates an independent master cylinder pressure to the first pressure chamber 21 and the second pressure chamber 22. The first pressure chamber 21 supplies a generated master cylinder pressure PmL to the brake actuator 40 via a first master passage 23. The second pressure chamber 22 supplies a generated master cylinder pressure PmR to the brake actuator 40 via a second master passage 24.

The reservoir 70 storing the operating fluid with the atmospheric pressure is provided on the master cylinder 20. The pressure chambers 21 and 22 in the master cylinder 20 communicate with the reservoir 70, when the pressure piston moves backward because the depression operation on the brake pedal 10 is released.

The stroke simulator device 75 is connected to the first master passage 23 via a simulator passage 76. The stroke simulator device 75 includes a stroke simulator 77 and a simulator cut valve 78. The simulator cut valve 78 is a normally closed solenoid valve that keeps closed by biasing force of a spring when a solenoid is not energized, but is opened only when the solenoid is energized. When the simulator cut valve 78 is closed, the flow of the operating fluid between the pressure chamber 21 and the stroke simulator 77 is cut off. When the simulator cut valve 78 is opened, the flow of the operating fluid between the pressure chamber 21 and the stroke simulator 71 is allowed in both directions.

The stroke simulator 77 includes plural pistons and springs. When the simulator cut valve 78 is opened, the stroke simulator 77 takes inside the operating fluid in an amount according to a brake operation amount to enable a stroke operation of the brake pedal 10, and generates reaction force according to a pedal operation amount to allow a driver to feel a satisfactory brake operation sense.

The power hydraulic pressure generating device 30 is a device that generates a high hydraulic pressure even if a brake operation is not performed. The power hydraulic pressure generating device 30 includes a pump 31 that sucks operating fluid from the reservoir 70 via an intake passage 71 and applies a pressure to the operating fluid, a motor 32 that drives the pump 31, and an accumulator 33. The accumulator 33 converts pressure energy of the operating fluid pressurized by the pump 31 into pressure energy of sealed gas such as nitrogen, and stores the resultant energy. The power hydraulic pressure generating device 30 supplies the pressurized operating fluid to the brake actuator 40 via an accumulator passage 35. The power hydraulic pressure generating device 30 also includes a relieve valve 34. The relief valve 34 is opened to return the operating fluid to the reservoir 70, when the pressure of the operating fluid becomes equal to or higher than a predetermined pressure. The hydraulic pressure of the operating fluid outputted from the power hydraulic pressure generating device 30 is referred to as an accumulator pressure Pacc.

The brake actuator 40 includes a main passage 36 communicating with the accumulator passage 35, a pilot input passage 37, a high-pressure supply passage 38, a return passage 72 communicating with the reservoir 70, and four individual passages 43FL, 43FR, 43RL, and 43RR communicating with each of the wheel cylinders 82FL, 82FR, 82RL, and 82RR. The brake actuator 40 also includes pressure-increasing linear control valves 44FL, 44FR, 44RL, and 44RR. The pressure-increasing linear control valves 44FR, 44RL, and 44RR excluding the pressure-increasing linear control valve 44FL are connected to the main passage 36. The individual passages 43FR, 43RL, and 43RR for three wheels are connected to the main passage 36 via the pressure-increasing linear control valves 44FR, 44RL, and 44RR. The pressure-increasing linear control valve 44FL is provided on the pilot input passage 37. This pilot input passage 37 communicates with the individual passage 43FL for the front-left wheel via a bypass passage 39 and a servo pressure passage 41, which are described later. The brake actuator 40 also includes pressure-decreasing linear control valves 45FL, 45FR, 45RL, and 45RR, and connects the individual passages 43FL, 43FR, 43RL, and 43RR to the return passage 72 via the pressure-decreasing linear control valves 45FL, 45FR, 45RL, and 45RR.

The pressure-increasing linear control valve 44 and the pressure-decreasing linear control valve 45 are solenoid linear control valves. The operating principle of the solenoid linear control valve will be described by using a normally closed solenoid linear control valve as an example. The normally closed solenoid linear control valve keeps closed by valve closing force (f1−f2) that is a difference between spring reaction force f1 of a spring for biasing a valve element in the valve closing direction and hydraulic pressure force f2 that biases the valve element in the valve opening direction due to a differential pressure ΔP between a pressure at an upstream side (inlet side) and a pressure at a downstream side (outlet side). When electromagnetic force f3 generated by an application of an electric current to a solenoid for opening the valve element exceeds the valve closing force, the valve is opened with an opening degree according to balance of force exerted on the valve element. Accordingly, the opening degree of the valve element is adjusted by controlling the amount of a current applied to the solenoid (current value), whereby the hydraulic pressure at the downstream side of the linear control valve can continuously be changed.

In the present embodiment, a normally closed solenoid linear control valve is used for the pressure-increasing linear control valves 44FL, 44FR, 44RL, and 44RR, and the pressure-decreasing linear control valves 45FL and 45FR for the front wheels, while a normally opened solenoid linear control valve is used for the pressure-decreasing linear control valves 45RL and 45RR for the rear wheels. With this, the pressure-increasing linear control valves 44FL, 44FR, 44RL, and 44RR are closed when their solenoids are not energized, and when their solenoids are energized, these valves are opened with an opening degree according to the amount of the current applied to the solenoids, thereby allowing the inflow of the operating fluid into the wheel cylinders 82FL, 82FR, 82RL, and 82RR from the power hydraulic pressure generating device 30 to increase the wheel cylinder pressure. The pressure-decreasing linear control valves 45FL and 45FR for the front wheels are closed when their solenoids are not energized, and when their solenoids are energized, these valves are opened with an opening degree according to the amount of the current applied to the solenoids, thereby allowing the outflow of the operating fluid to the reservoir 70 from the wheel cylinders 82FL and 82FR to decrease the wheel cylinder pressure. The pressure-decreasing linear control valves 45RL and 45RR for the rear wheels are opened when their solenoids are not energized, thereby allowing the outflow of the operating fluid to the reservoir 70 from the wheel cylinders 82RL and 82RR to decrease the wheel cylinder pressure. However, when their solenoids are energized, these valves are closed to inhibit the outflow of the operating fluid to the reservoir 70 from the wheel cylinders 82RL and 82RR. In this case, when the amount of the current applied to the solenoids is small, the valve elements in the pressure-decreasing linear control valves 45RL and 45RR do not move up to the valve closing position, so that these valves are adjusted to have an opening degree according to the amount of the applied current.

Accordingly, an execution of an energization control of the pressure-increasing linear control valve 44 and the pressure-decreasing linear control valve 45 can switch among a state in which the inflow of the operating fluid to the wheel cylinder 82 from the power hydraulic pressure generating device 30 is allowed, a state in which the outflow of the operating fluid from the wheel cylinder 82 to the reservoir 70 is allowed, and a state in which neither the inflow of the operating fluid to the wheel cylinder 82 from the power hydraulic pressure generating device 30 nor the outflow of the operating fluid from the wheel cylinder 82 to the reservoir 70 is allowed. With this, the wheel cylinder pressure of each wheel can independently be controlled to a target hydraulic pressure.

The brake actuator 40 also includes a front-wheel left-right communication passage 42 that communicates the individual passage 43FL for the front-left wheel and the individual passage 43FR for the front-right wheel. A front-wheel communication on-off valve 46 is provided on the front-wheel left-right communication passage 42. The front-wheel communication on-off valve 46 is a normally opened solenoid valve that keeps opened by biasing force of a spring to allow a bidirectional flow of the operating fluid, when a its solenoid is not energized, but that is closed to cut off the flow of the operating fluid only when its solenoid is energized.

The brake actuator 40 includes the first master passage 23 to which the operating fluid (with the master cylinder pressure PmL) is supplied from the first pressure chamber 21 in the master cylinder 20, and the second master passage 24 to which the operating fluid (with the master cylinder pressure PmR) is supplied from the second pressure chamber 22 in the master cylinder 20. The second master passage 24 is connected to the individual passage 43FR for the front-right wheel. The second master passage 24 has a second master cut valve 47 provided thereon. The second master cut valve 47 is a normally closed solenoid valve that keeps closed by biasing force of a spring, when its solenoid is energized, but that is opened only when its solenoid is energized. When the second master cut valve 47 is closed, the flow of the operating fluid between the second pressure chamber 22 in the master cylinder 20 and the wheel cylinder 82FR for the front-right wheel is cut off, and when the second master cut valve 47 is opened, the flow of the operating fluid between the second pressure chamber 22 in the master cylinder 20 and the wheel cylinder 82FR is allowed in both directions.

Figure 2:
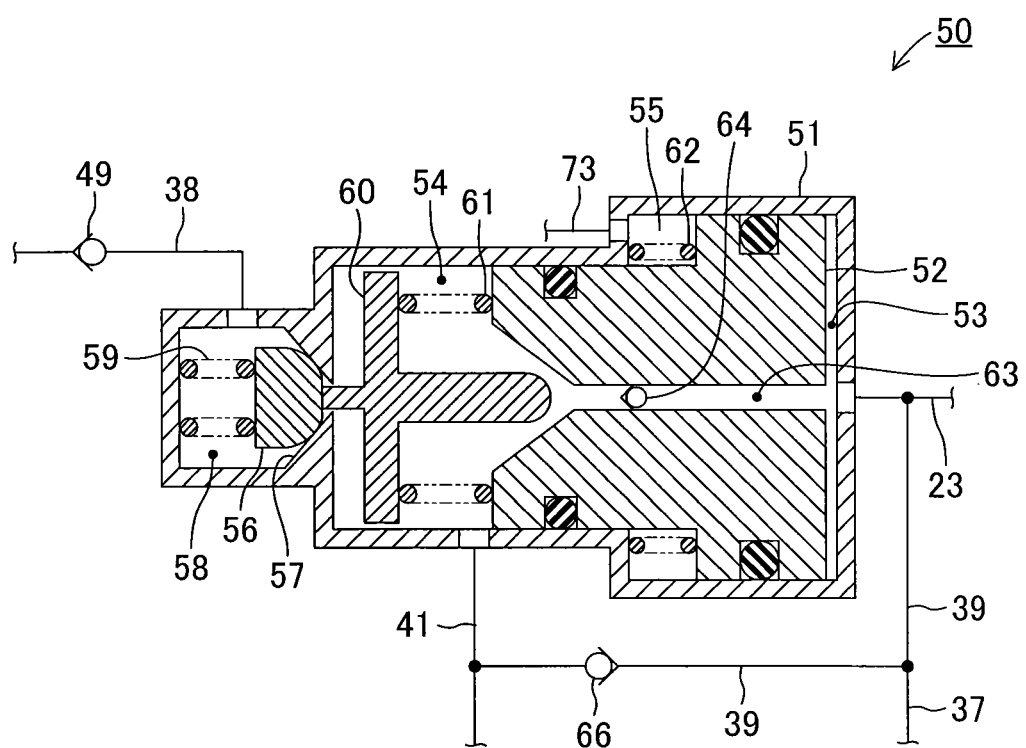
FIG. 2 is a diagram illustrating a schematic configuration of a pressure-increasing device.

The brake actuator 40 includes the pressure-increasing device 50 to which the master cylinder pressure PmL is supplied via the first master passage 23. The pressure-increasing device 50 is a pilot-type mechanical valve that is activated without using electric energy. The pressure-increasing device 50 receives the master cylinder pressure PmL as a pilot pressure, and outputs a hydraulic pressure higher than the master cylinder pressure PmL by utilizing the hydraulic pressure (accumulator pressure Pacc) outputted from the power hydraulic generating device 30. In other words, the pressure-increasing device 50 is a mechanical pilot valve device that adjusts the accumulator pressure Pacc to a hydraulic pressure having a predetermined pressure-increase ratio (>1) relative to the master cylinder pressure PmL by using the master cylinder pressure, and outputs the adjusted hydraulic pressure. As illustrated in FIG. 2, the pressure-increasing device 50 includes a housing 51, and a stepped piston 52 fitted liquid-tight and slidable to the housing 51. A large-diameter chamber 53 is formed at the large-diameter side of the stepped piston 52, while a small-diameter chamber 54 is formed at the small-diameter side. The small-diameter chamber 54 can communicate with a high-pressure chamber 58 via a high-pressure supply valve 56 and a valve seat 57. The high-pressure supply valve 56 is a normally closed valve that is pressed against the valve seat 57 in the high-pressure chamber 58 due to biasing force of a spring 59.

A valve-opening member 60 is provided opposite to the high-pressure supply valve 56 in the small-diameter chamber 54, and a spring 61 is disposed between the valve-opening member 60 and the stepped piston 52. The biasing force of the spring 61 is exerted in the direction of separating the valve-opening member 60 from the stepped piston 52. A return spring 62 disposed between a step portion of the stepped piston 52 and the housing 51 biases the stepped piston 52 in the backward direction. Notably, an unillustrated stopper is disposed between the stepped piston 52 and the housing 51 to restrict a forward end position of the stepped piston 52.

A communication path 63 that communicates the large-diameter chamber 53 and the small-diameter chamber 54 is formed in the stepped piston 52. An in-piston check valve 64 is provided on the communication path 63. The in-piston check valve 64 inhibits the flow of the operating fluid toward the small-diameter chamber 54 from the large-diameter chamber 53, and allows the flow of the operating fluid toward the large-diameter chamber 53 from the small-diameter chamber 54. The communication path 63 communicates the large-diameter chamber 53 and the small-diameter chamber 54 on at least the backward end position of the stepped piston 52 as separated from the valve-opening member 60, as illustrated in FIG. 2. When the stepped piston 52 moves forward to contact the valve-opening member 60, the communication path 63 is closed.

As illustrated in FIG. 1, the high-pressure chamber 58 is connected to an output side of the power hydraulic pressure generating device 30 by the high-pressure supply passage 38. A pressure-increase cut valve 48 and a high-pressure supply passage check valve 49 are provided on the high-pressure supply passage 38. Therefore, the operating fluid (accumulator pressure Pacc) is supplied to the high-pressure chamber 58 via the pressure-increase cut valve 48 and the high-pressure supply passage check valve 49. The pressure-increase cut valve 48 is a normally opened solenoid valve that keeps opened by biasing force of a spring, when its solenoid is not energized, but is closed only when its solenoid is energized. When the pressure-increase cut valve 48 is closed, the flow of the operating fluid between the power hydraulic pressure generating device 30 and the pressure-increasing device 50 is cut off, and when the pressure-increase cut valve 48 is opened, the flow of the operating fluid between the power hydraulic pressure generating device 30 and the pressure-increasing device 50 is allowed in both directions. The high-pressure supply passage check valve 49 allows the flow of the operating fluid toward the high-pressure chamber 58 from the power hydraulic pressure generating device 30, and inhibits the flow in the opposite direction.

The small-diameter chamber 54 is a part outputting a hydraulic pressure in the pressure-increasing device 50, and it is connected to the individual passage 43FL for the front-left wheel by the servo pressure passage 41. The large-diameter chamber 53 is a part (pilot input part) receiving the operating fluid (master cylinder pressure PmL) supplied from the first pressure chamber 21 in the master cylinder 20, and it is connected to the first pressure chamber 21 in the master cylinder 20 by the first master passage 23. A first master cut valve 65 is disposed on the first master passage 23. The first master cut valve 65 is a normally opened solenoid valve that keeps opened by biasing force of a spring when its solenoid is not energized, but is closed only when its solenoid is energized. When the first master cut valve 65 is closed, the flow of the operating fluid between the first pressure chamber 21 in the master cylinder 20 and the large-diameter chamber 53 in the pressure-increasing device 50 is cut off, and when the first master cut valve 65 is opened, the flow of the operating fluid between the first pressure chamber 21 and the large-diameter chamber 53 is allowed in both directions.

One end of the bypass passage 39 is connected to the first master passage 23 at a position between the large-diameter chamber 53 and the first master cut valve 65. The other end of the bypass passage 39 is connected to the servo pressure passage 41. With this configuration, the bypass passage 39 connects the first master passage 23 and the servo pressure passage 41 by bypassing the pressure-increasing device 50. The bypass passage 39 has formed thereon a bypass check valve 66 that allows the flow of the operating fluid from the first master passage 23 to the servo pressure passage 41 and inhibits the flow of the operating fluid from the servo pressure passage 41 to the first master passage 23. A chamber 55 formed by the step portion of the stepped piston 52 and the housing 51 communicates with the return passage 72 by a pressure-increasing-device return passage 73. Accordingly, this chamber 55 communicates with the reservoir 70 via the pressure-increasing-device return passage 73 and the return passage 72.

Next, an operation of the pressure-increasing device 50 will be described. When the operating fluid (master cylinder pressure PmL) is supplied to the large-diameter chamber 53 from the master cylinder 20 by a driver's operation on the brake pedal with the first master cut valve 65 being opened, force in the forward direction is exerted to the stepped piston 52 in the pressure-increasing device 50. When this force in the forward direction exceeds an activation start pressure (pressure with a magnitude by which the stepped piston 52 moves forward against sliding resistance and biasing force of the spring), the stepped piston 52 moves forward. With this motion, the stepped piston 52 contacts the valve-opening member 60 to close the communication path 63, and the high-pressure supply valve 56 is changed to an open state due to the forward movement of the valve-opening member 60. When the high-pressure supply valve 56 is changed to the open state, high-pressure operating fluid is supplied to the small-diameter chamber 54 from the high-pressure chamber 58, whereby the hydraulic pressure in the small-diameter chamber 54 increases. In the case where an accumulator pressure Pacc outputted from the power hydraulic pressure generating device 30 is higher than the hydraulic pressure in the high-pressure chamber 58 because the pressure-incerase cut valve 48 is opened, high-pressure operating fluid is supplied to the high-pressure chamber 58 from the power hydraulic pressure generating device 30 via the high-pressure supply passage check valve 49, whereby the hydraulic pressure in the small-diameter chamber 54 increases. The hydraulic pressure in the small-diameter chamber 54 is determined by a ratio of the hydraulic pressure (master cylinder pressure PmL) in the large-diameter chamber 53 and an area of a pressure-receiving surface between the large-diameter part and the small.-diameter part of the stepped piston 52. When a hydraulic pressure in the small-diameter chamber 54 is defined as Pc, a hydraulic pressure in the large-diameter chamber is defined as PmL, the area of the pressure-receiving surface of the large-diameter part in the stepped piston 52 is defined as Sm, the area of the pressure-receiving surface of the small-diameter part in the stepped piston 52 is defined as Sc, and an activation start pressure of the pressure-increasing device 50 is defined as zero, the hydraulic pressure Pc in the small-diameter chamber 54 is controlled to be the hydraulic pressure represented by the equation described below.

$$Pc=PmL\cdot(Sm/Sc)$$

The hydraulic pressure generated in the small-diameter chamber 54 is supplied to the serve pressure passage 41. As described above, the pressure-increasing device 50 is a pilot-type mechanical valve that adjusts the accumulator pressure Pacc supplied from the power hydraulic pressure generating device 30 to a hydraulic pressure having a predetermined pressure-increase ratio (>1) relative to the master cylinder pressure PmL inputted to the large-diameter chamber 53, and outputs the adjusted hydraulic pressure. Accordingly, the large-diameter chamber 53 functions as a pilot unit receiving pilot pressure. The first master passage 23 between the large-diameter chamber 53 and the first master cut valve 65 is referred to as a master pilot passage 23P below.

On the other hand, when the accumulator pressure Pacc is equal to or lower than the hydraulic pressure in the high-pressure chamber 58 because the pressure-increase cut valve 58 is opened, the operating fluid is not supplied to the high-pressure chamber 58 from the power hydraulic pressure generating device 30. With this, the stepped piston 52 cannot move forward (the stepped piston 52 is considered to contact to a stopper). Accordingly, the hydraulic pressure in the small-diameter chamber 54 does not increase more, so that the pressure-increasing function of the pressure-increasing device 50 cannot be exhibited. When the master cylinder pressure PmL supplied from the master cylinder 20 increases from this state to become higher than the hydraulic pressure in the small-diameter chamber 54, the master cylinder pressure PmL is supplied to the servo pressure passage 41 via the bypass passage 39 and the bypass check valve 66.

As described later, the brake control device according to the present embodiment includes a function of checking whether the pressure-increasing device 50 is normally activated or not. The activation check of the pressure-increasing device 50 is performed based on the hydraulic pressure outputted from the small-diameter chamber 54 in the pressure-increasing device 50 upon the input of the hydraulic pressure to the pilot unit (large-diameter chamber 53) in the pressure-increasing device 50. The hydraulic pressure can also be inputted to the pilot unit 53 by using the master cylinder pressure PmL generated in response to the driver's operation on the brake pedal. However, in this case, the driver has to do a pedal operation, and depending on the way the pedal operation is performed, it is likely that an appropriate check result cannot be obtained. In view of this, the present embodiment is configured to adjust the accumulator pressure Pacc, not the master cylinder pressure PmL, to the hydraulic pressure for the activation check, and to supply the adjusted hydraulic pressure to the pilot unit 53 of the pressure-increasing device 50.

The brake actuator 40 includes the pilot input passage 37. The pilot input passage 37 forms a passage that supplies a hydraulic pressure to the pilot unit 53 of the pressure-increasing device 50 from the power hydraulic pressure generating device 30. As illustrated in FIG. 1, the pilot input passage 37 connects the accumulator passage 35 and the bypass passage 39 (the bypass passage 39 at the position close to the master pilot passage 23P than the bypass check valve 66). The pressure-increasing linear control valve 44FL is provided on the pilot input passage 37. With this configuration, the pilot pressure can be controlled by utilizing the pressure-increasing linear control valve 44FL for controlling the hydraulic pressure of the wheel cylinder 82FL for the front-left wheel.

The brake actuator 40 also includes an accumulator pressure sensor 67, master cylinder pressure sensors 68L and 68R, and wheel cylinder pressure sensors 69FL, 69FR, 69RL, and 69RR. The accumulator pressure sensor 67 detects an accumulator pressure Pacc that is a hydraulic pressure outputted from the power hydraulic pressure generating device 30. The master cylinder pressure sensor 68L detects a master cylinder pressure PmL that is a hydraulic pressure outputted from the first pressure chamber 21 in the master cylinder 20, and the master cylinder pressure sensor 68R detects a master cylinder pressure PmR that is a hydraulic pressure outputted from the second pressure chamber 22 in the master cylinder 20. The wheel cylinder pressure sensors 69FL, 69FR, 69RL, and 69RR detect wheel cylinder pressures PwFL, PwFR, PwRL, and PwRR that are hydraulic pressures of the wheel cylinders 82FL, 82FR, 82RL, and 82RR.

The power hydraulic pressure generating device 30, the brake actuator 40, and the stroke simulator device 75 are controlled to be driven by the brake ECU 100. The brake ECU 100 includes a microcomputer as a main component, and also includes, for example, a pump drive circuit, a solenoid valve drive circuit, an input interface receiving signals from various sensors, a communication interface, and a power supply circuit. Four pressure-increasing linear control valves 44, four pressure-decreasing linear control valves 45, the front-wheel communication on-off valve 46, the master cut valves 47 and 65, and the simulator cut valve 78 are connected to the brake ECU 100. The brake ECU 100 outputs a solenoid drive signal to these valves to control to open or close each valve and to control the opening degree (in the case of the linear control valve) of each valve. The motor 32 provided to the power hydraulic pressure generating device 30 is also connected to the brake ECU 100, and the brake ECU 100 outputs a drive signal to the motor 32 to control to drive the motor 32.

The accumulator pressure sensor 67, the master cylinder pressure sensors 68R and 68L, and the wheel cylinder pressure sensors 69FR, 69FL, 69RR, and 69RL are connected to the brake ECU 100, whereby the brake ECU 100 receives signals indicating the accumulator pressure Pacc, the master cylinder pressures PmL and PmR, and the wheel cylinder pressures PwFR, PwFL, PwRR, and PwRL.

A pedal stroke sensor 110 and a pedal switch 111 are also connected to the brake ECU 100. The pedal stroke sensor 110 is a type of a pedal operation detecting device, and it detects a pedal stroke that is a depression amount of the brake pedal 10 and outputs a signal indicating the detected pedal stroke Sp to the brake ECU 100. The pedal switch 111 is turned on upon the depression of the brake pedal 10 up to a set position to turn on a stop lamp not illustrated. The pedal switch 111 outputs a signal (pedal switch signal) indicating a state of the switch to the brake ECU 100.

The brake ECU 100 is started when an ignition switch is turned on, or a courtesy switch outputting a signal according to an open/close state of a door of the vehicle is turned on (when the door is opened). Before the brake ECU 100 is started, energization of all solenoid control valves (on-off valves and linear control valves) provided to the brake actuator 40 and the stroke simulator device 75 is stopped. Therefore, the on/off state of each solenoid control valve is as illustrated in FIG. 1. Energization of the power hydraulic pressure generating device 30 is also stopped.

Next, a brake control executed by the brake ECU 100 will be described. Firstly, a brake control in the case where the brake control device is normal (in the case where there is no suspected leakage of the operating fluid, or in the case where something abnormal does not occur in the control system) will be described. The brake ECU 100 executes a hydraulic control for generating braking force by allowing the hydraulic pressure of each wheel cylinder to follow a target hydraulic pressure. The target hydraulic pressure used for the hydraulic control is different depending on a vehicle to which the brake control device is applied. An electric vehicle or a hybrid vehicle can perform a regenerative braking control in which rotating force of wheels generates electric power from a traveling drive motor, and the generated electric power is collected to a battery to acquire braking force. Therefore, such vehicle can perform brake regenerative cooperation control using both regenerative braking and hydraulic braking. On the other hand, a vehicle that generates driving force only by an internal combustion engine cannot generate regenerative braking force. Therefore, such vehicle generates braking force only by the hydraulic control. The brake control device according to the present embodiment is applied to an electric vehicle or a hybrid vehicle to perform a brake regenerative cooperation control, but can be applied to a vehicle generating driving force only by an internal combustion engine.

In the hydraulic control, a pedal effort obtained by the driver's depressing operation of the brake pedal 10 is used only for detecting the brake operation amount without being transmitted to the wheel cylinder 82. Instead, the accumulator pressure Pacc outputted from the power hydraulic pressure generating device 30 is transmitted to the wheel cylinder 82 after being individually adjusted by the pressure-increasing linear control valve 44 and the pressure-decreasing linear control valve 45 for each wheel. In the hydraulic control, the master cut valves 65 and 47 are maintained to be closed. In this case, the first master cut valve 65 that is a normally opened solenoid valve is kept closed due to energization of the solenoid. The pressure-increase cut valve 48 is kept closed due to energization of the solenoid. The simulator cut valve 78 is kept opened due to energization of the solenoid. The front-wheel communication on-off valve 46 is kept closed due to energization of the solenoid. All of the pressure-increasing linear control valves 44 and the pressure-decreasing linear control valves 45 are controlled to have an opening degree according to an energization amount under an energization control state.

In this case, the activation of the pressure-increasing device 50 is restricted, since the first master cut valve 65 and the pressure-increase cut valve 48 are kept closed. In other words, the pressure-increasing device 50 is in a disabled state. Accordingly, the hydraulic pressure outputted from the master cylinder 20 and the hydraulic pressure outputted from the pressure-increasing device 50 are not supplied to the wheel cylinder 82 of each wheel, but the accumulator pressure Pacc outputted from the power hydraulic pressure generating device 30 is supplied after being individually adjusted.

The brake ECU 100 starts the brake regenerative cooperation control in response to a brake request. The brake request is generated when braking force has to be applied to the vehicle, e.g., when a driver depresses the brake pedal 10. When receiving the brake request, the brake ECU 100 calculates requested braking force based on the pedal stroke Sp detected by the pedal stroke sensor 110 and the master cylinder pressures PmL and PmR detected by the master cylinder pressure sensors 68L and 68R. In this case, the brake ECU 100 sets either one of the master cylinder pressures PmL and PmR or a value (e.g., an average) formed by combining both pressures as a master cylinder pressure Pm.

The requested braking force is set larger, as the pedal stroke Sp is larger, or as the master cylinder pressure Pm is larger. In this case, weighting coefficients Ks and Kr are multiplied respectively to the pedal stroke Sp and the master cylinder pressure Pm. The requested braking force may be calculated by setting the weighting coefficient Ks for the pedal stroke Sp to be larger within the range where the pedal stroke Sp is small, or by setting the weighting coefficient Kr for the master cylinder pressure Pm to be larger within the range where the pedal stroke Sp is large.

The brake ECU 100 transmits information indicating the calculated requested braking force to a regenerative ECU. The regenerative ECU calculates braking force generated due to power regeneration in the requested braking force, and transmits information indicating the regenerative braking force, which is the result of the calculation, to the brake ECU 100. With this process, the brake ECU 100 calculates requested hydraulic braking force, which is braking force that should be generated by the brake control device, by subtracting the regenerative braking force from the requested braking force. The regenerative braking force generated due to the power regeneration by the regenerative ECU changes not only by the rotating speed of the motor, but also by a regenerative current control due to a state of charge (SOC) of a battery, for example. Accordingly, the brake ECU 100 can calculate appropriate requested hydraulic braking force by subtracting the regenerative braking force from the requested braking force.

The brake ECU 100 calculates a target hydraulic pressure of each wheel cylinder 82 based on the calculated requested hydraulic braking force, and controls a drive current of the pressure-increasing linear control valve 44 and the pressure-decreasing linear control valve 45 by a feedback control so as to cause the wheel cylinder pressure to be equal to the target hydraulic pressure. Specifically, the brake ECU 100 controls a current flowing through the pressure-increasing linear control valve 44 and the pressure-decreasing linear control valve 45 in order that the wheel cylinder pressure Pw detected by the wheel cylinder pressure sensor 69 for each wheel follows the target hydraulic pressure.

With this process, the operating fluid is supplied to the wheel cylinder 82 from the power hydraulic pressure generating device 30 via the pressure-increasing linear control valve 44, whereby braking force is applied to the wheels. In addition, the operating fluid is discharged from the wheel cylinder 82 via the pressure-decreasing linear control valve 45 as necessary, whereby the braking force applied to the wheels is adjusted.

During the normal brake control, the same target hydraulic pressure is set for four wheels. However, when a vehicle behavior control such as a turning control or a special brake control such as an ABS control is performed, a different target hydraulic pressure is set for each wheel, and the pressure-increasing linear control valve 44 and the pressure-decreasing linear control valve 45 are controlled in order that the wheel cylinder pressure Pw detected by the wheel cylinder pressure sensor 69 for each wheel follows the corresponding target hydraulic pressure.

The brake ECU 100 stores valve-opening current characteristics of each of the pressure-increasing linear control valves 44 and each of the pressure-decreasing linear control valves 45 for controlling the energization of the pressure-increasing linear control valves 44 and the pressure-decreasing linear control valves 45. A solenoid linear control valve has a certain relationship between a differential pressure ΔP, which is a difference between an upstream-side hydraulic pressure (inlet-side hydraulic pressure) and a downstream-side hydraulic pressure (outlet-side hydraulic pressure), and a valve-opening current. In a normally closed solenoid linear control valve, the valve-opening current means a current value at the time when a valve element that is closed starts to be opened due to an increase in a current flowing through a solenoid. In a normally opened solenoid linear control valve, the valve-opening current means a current value at the time when a valve element that is closed starts to be opened due to a decrease in a current flowing through a solenoid. The valve-opening current characteristic represents a correlation between the valve-opening current and the differential pressure ΔP.

When controlling the energization of the pressure-increasing linear control valve 44 and the pressure-decreasing linear control valve 45, the brake ECU 100 obtains a valve-opening current i open corresponding to the differential pressure ΔP between the upstream-side hydraulic pressure and the downstream-side hydraulic pressure of the linear control valve by referring to the valve-opening current characteristic, and sets a target current i* applied to the linear control valve by using the valve-opening current i open as a reference. For example, the target current i* is calculated by adding a value, which is obtained by multiplying a deviation between the target hydraulic pressure P* and the wheel cylinder pressure Pw by a feedback gain Gfb, to the valve-opening current i open (i*=i open+Gfb·(P*−Pw)). When the deviation (P*−Pw) is positive, the pressure-increasing linear control valve 44 is opened with an opening degree according to the deviation to increase the wheel cylinder pressure. When the deviation (P*−Pw) is negative, a feedback control term is calculated by using the absolute value of the deviation, and the pressure-decreasing linear control valve 45 is opened with an opening degree according to the absolute value of the deviation to decrease the wheel cylinder pressure. The feedback gain Gfb is separately set upon increasing pressure and upon decreasing pressure. For the calculation of the target current, a feed forward control may be employed, instead of the feedback control. Alternatively, the feedback control and the feed forward control may be combined.

When the accumulator pressure Pacc detected by the accumulator pressure sensor 67 is less than a minimum set pressure set beforehand, the brake ECU 100 drives the motor 32 to increase the pressure of the operating fluid by the pump 31 so as to control the accumulator pressure Pacc to always fall within the set pressure range.

The brake ECU 100 also keeps the simulator cut valve 72 opened. With this, the operating fluid sent from the first pressure chamber 21 in the master cylinder 20 is supplied to the stroke simulator 77 with the driver's pedal operation for the brake pedal 10. Thus, the brake ECU 100 can exert reaction force according to the driver's pedal effort to the brake pedal 10, thereby being capable of providing satisfactory pedal operation feeling to the driver.

Figure 3:
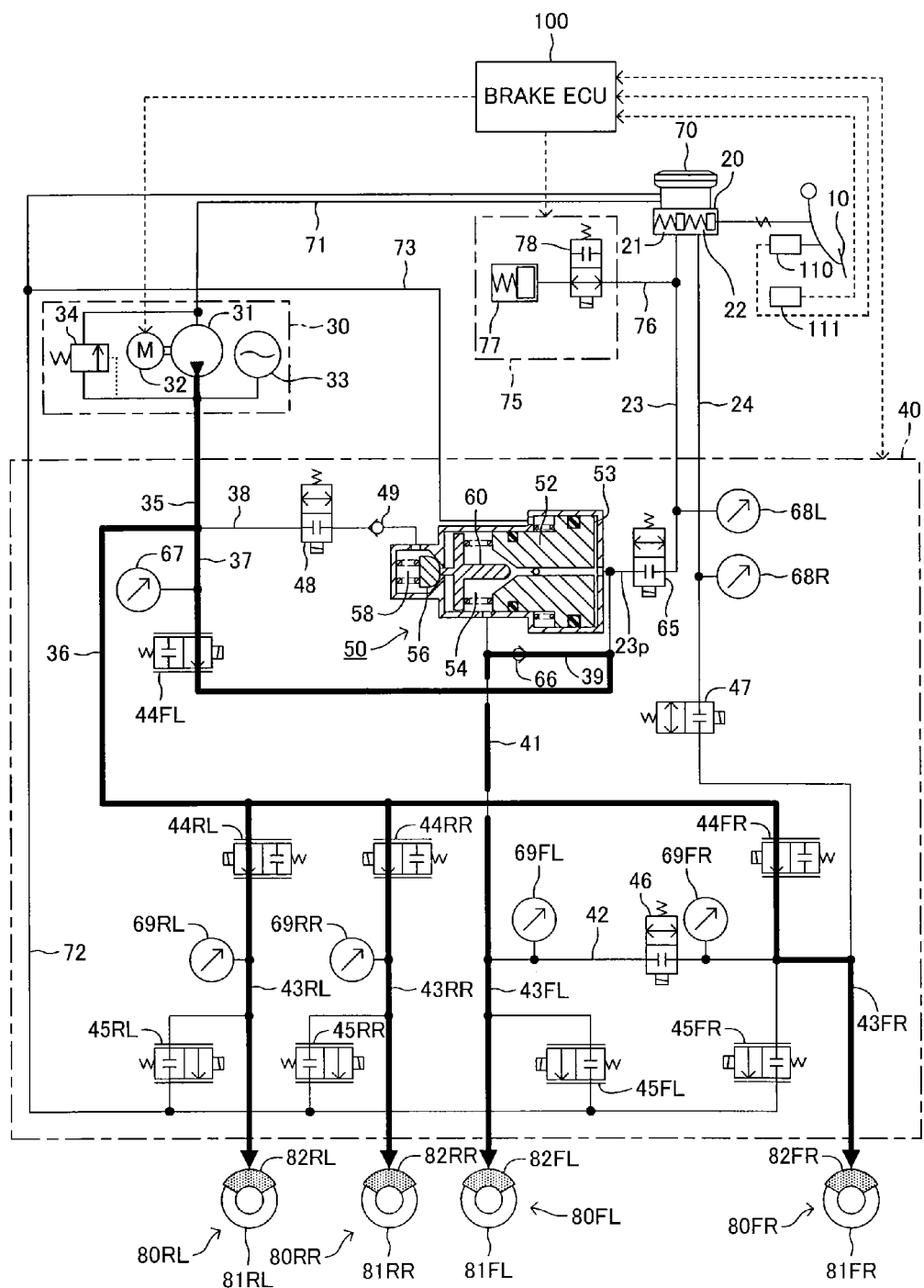
FIG. 3 is an explanatory view illustrating a hydraulic pressure supply passage during a hydraulic control according to the first embodiment.

In FIG. 3, the hydraulic supply paths of the operating fluid upon the increase in each wheel cylinder pressure by the hydraulic control described above are illustrated with bold arrows. A hydraulic pressure is supplied to the wheel cylinders 82FR, 82RL, and 82RR for three wheels except for the front-left wheel via the main passage 36, the pressure-increasing linear control valves 44FR, 44RL, and 44RR, and the individual passages 43FR, 43RL, and 43RR. Therefore, the hydraulic pressure obtained by adjusting the accumulator pressure Pacc by the pressure-increasing linear control valves 44FR, 44RL, and 44RR is supplied to each of the wheel cylinders 82FR, 82RL, and 82RR. On the other hand, a hydraulic pressure is supplied to the wheel cylinder 82FL for the front-left wheel via the pilot input passage 37, the pressure-increasing linear control valve 44FL, the bypass passage 39, the bypass check valve 66, the servo pressure passage 41, and the individual passage 43FL. Accordingly, the hydraulic pressure obtained by adjusting the accumulator pressure Pacc by the pressure-increasing linear control valve 44FL is supplied to the wheel cylinder 82FL for the front-left wheel. Thus, the wheel cylinder pressures of four wheels can independently be controlled.

When the operation on the brake pedal is not performed, the brake ECU 100 stops energization of the solenoids of all valves provided to the brake actuator 40. Accordingly, each valve is returned to the original position in FIG. 1. In the pressure-increasing device 50, the stepped piston 52 is separated from the valve-opening member 60. With this movement, the hydraulic pressure of the wheel cylinder 82FL for the front-left wheel is returned to the master cylinder 20 (reservoir 70) via the communication path 63 and the in-piston check valve 64. The hydraulic pressure of the wheel cylinder 82FR for the front-right wheel becomes equal to the hydraulic pressure of the wheel cylinder 82FL for the front-left wheel, because the front-wheel communication on-off valve 46 is kept opened, and this hydraulic pressure of the wheel cylinder 82FR for the front-right wheel is returned to the master cylinder 20 (reservoir 70). The hydraulic pressures of the wheel cylinders 82RL and 82RR for the left and right rear wheels are returned to the reservoir 70 via the pressure-decreasing linear control valves 45RL and 45RR.

Next, a process executed by the brake ECU 100 upon an occurrence of abnormality in the brake control device will be described. The brake ECU 100 includes an abnormality detecting unit that detects abnormality in the brake control device, such as abnormality in the control system, or abnormal leakage of the operating fluid. This abnormality detecting unit repeatedly executes an abnormality detecting routine (not illustrated) at a predetermined cycle. When abnormality is detected, the brake ECU 100 sets a different hydraulic pressure supply manner to the wheel cylinder between the case where abnormality occurs on the control system and the case where abnormal leakage of operating fluid occurs.

The abnormality detection will be described here. The abnormality of the control system means a state in which a hydraulic pressure of at least one of the wheel cylinders 82 cannot be controlled. For example, the abnormality of the control system corresponds to the case where the solenoid control valves including the pressure-increasing linear control valve 44, the pressure-decreasing linear control valve 45, the front-wheel communication on-off valve 46, the master cut valves 65 and 47, and the simulator cut valve 78 are disconnected or short-circuited. The abnormality of the control system also corresponds to the case where the sensors including the hydraulic pressure sensors 67, 68L, 68R, 69FL, 69FR, 69RL, and 69RR, and the pedal stroke sensor 110 do not output appropriate detection values. The abnormality of the control system also corresponds to the case where operating fluid with appropriate pressure cannot be supplied from the power hydraulic pressure generating device 30 (e.g., the motor 32 is in failure). The abnormality of the control system also corresponds to an abnormal power supply state where appropriate electric power cannot be supplied to the solenoid valves, sensors, and motors.

On the other hand, as for the abnormal leakage of the operating fluid, it does not matter whether the possibility of the leakage of the operating fluid is high or low, or whether the leaked amount is large or small. Therefore, the state where it cannot be determined that the leakage does not occur is determined as abnormal leakage of the operating fluid, even when the possibility of the leakage of the operating fluid is extremely low, or even when the leaked amount is extremely small. The leakage of the operating fluid corresponds to the case where a level switch (not illustrated) provided to the reservoir 70 detects the reduction in a level of the operating fluid. The leakage of the operating fluid also corresponds to the case where the relationship between the stroke of the brake pedal 10 and the hydraulic pressure of the master cylinder 20 is outside an appropriate range. The leakage of the operating fluid corresponds to the case where the accumulator pressure Pacc detected by the accumulator pressure sensor 67 does not exceed a fluid leakage determination value, even if the pump 31 continues to operate for a set time or longer.

When determining the abnormality of the control system, the brake ECU 100 stops energization of all electric actuators (control valves and motors). Even when the brake ECU 100 is in failure, the energization of all electric actuators (control valves and motors) is similarly stopped. Thus, the solenoid control valves (solenoid valves, and solenoid linear control valves) are returned to their original position. In this case, the first master cut valve 65 that is a normally opened valve is opened, whereby the first pressure chamber 21 in the master cylinder 20 and the large-diameter chamber 53 (pilot unit) in the pressure-increasing device 50 communicate with each other. In addition, the pressure-increase cut valve 48 that is a normally opened valve is opened, whereby the power hydraulic pressure generating device 30 and the high-pressure chamber 58 in the pressure-increasing device 50 communicate with each other via the high-pressure supply passage check valve 49. The front-wheel communication on-off valve 46 that is a normally opened valve is opened, whereby the individual passage 43FL for the front-left wheel and the individual passage 43FR for the front-right wheel communicate with each other.

Figure 4:
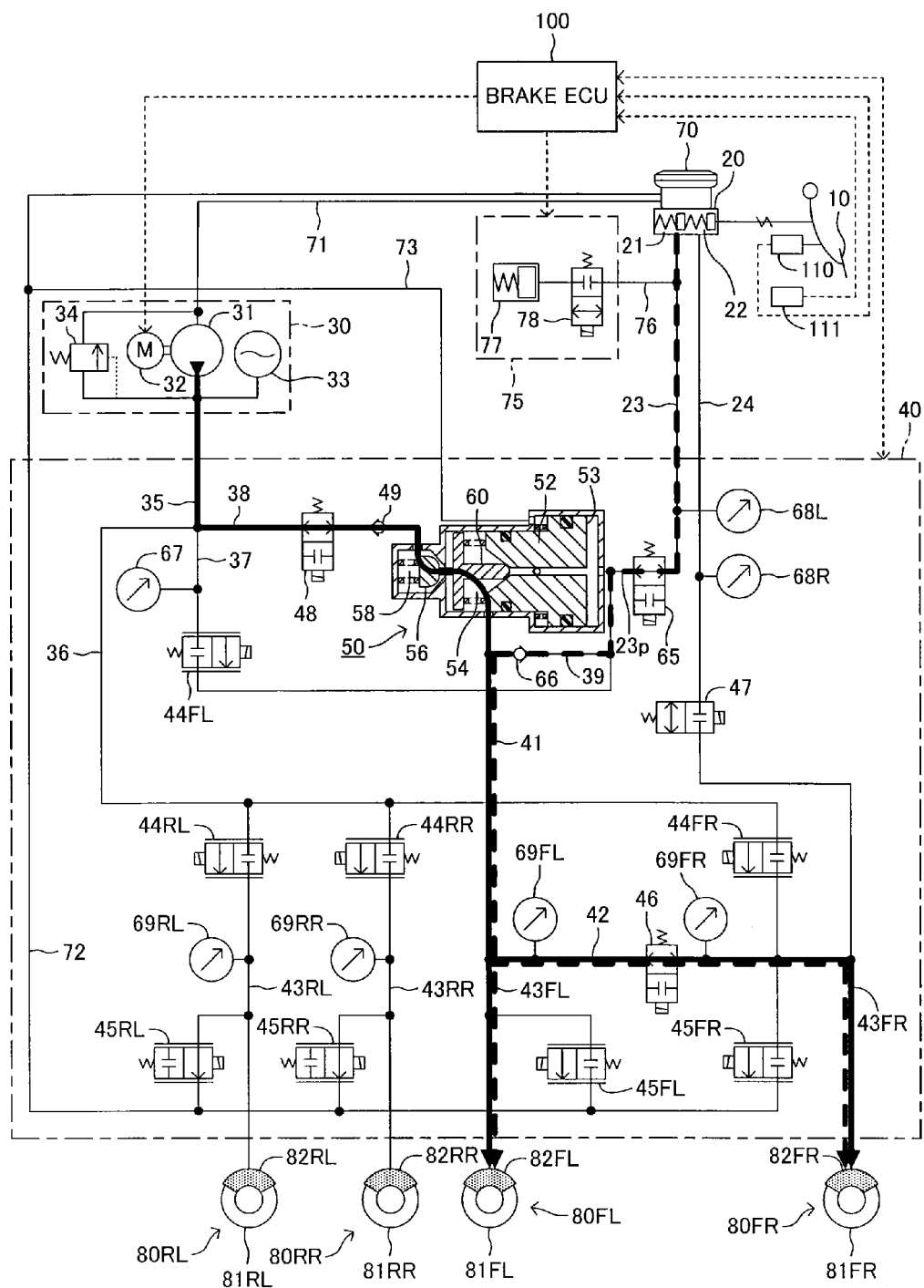
FIG. 4 is an explanatory view illustrating a hydraulic pressure supply passage according to the first embodiment, when a control system has abnormality.

When abnormality occurs on the control system, the activation of the pump 31 in the power hydraulic pressure generating device 30 is stopped. However, when the hydraulic pressure (accumulator pressure Pacc) stored in the accumulator 33 becomes higher than an activatable pressure of the pressure-increasing device 50, and the master cylinder pressure PmL generated by the depression operation on the brake pedal 10 exceeds the activation start pressure, the high-pressure supply valve 56 is switched to an open state due to a forward movement of the stepped piston 52, so that high-pressure operating fluid is supplied to the small-diameter chamber 54 from the high-pressure chamber 58. Thus, a hydraulic pressure (referred to as a servo pressure) with a magnitude obtained by multiplying the master cylinder pressure PmL, which is a pilot pressure, supplied to the large-diameter chamber 53 by a pressure-increase ratio (>1) is generated in the servo pressure passage 41. This servo pressure is supplied not only to the wheel cylinder 82FL for the front-left wheel, but also to the wheel cylinder 82FR for the front-right wheel via the front-wheel left-right communication passage 42. Accordingly, the hydraulic supply paths for the wheel cylinders 82FL and 82FR for the left and right front wheels are as illustrated by bold arrows in FIG. 4. Specifically, the accumulator pressure Pacc outputted from the power hydraulic pressure generating device 30 is supplied to the high-pressure chamber 58 in the pressure-increasing device 50 via the high-pressure supply passage 38, the pressure-increase cut valve 48, and the high-pressure supply passage check valve 49, while the servo pressure adjusted by the pressure-increasing device 50 is supplied to the servo pressure passage 41 from the small-diameter chamber 54. The servo pressure is supplied to the wheel cylinder 82FL for the front-left wheel via the individual passage 43FL, and also supplied to the wheel cylinder 82FR for the front-right wheel via the front-wheel left-right communication passage 42, the front-wheel communication on-off valve 46, and the individual passage 43FR. Accordingly, a sufficient hydraulic pressure can be supplied to the wheel cylinders 82FL and 82FR for the front wheels that contribute to braking larger than the rear wheels.

When the accumulator pressure Pacc is decreased to be lower than the activatable pressure of the pressure-increasing device 50 due to repeated operation on the brake pedal by the driver, the operating fluid is not supplied to the high-pressure chamber 58 from the power hydraulic pressure generating device 30, whereby the pressure-increasing device 50 is disabled. In this case, when the master cylinder pressure PmL generated by the drive's depression operation on the brake pedal becomes higher than the hydraulic pressure in the small-diameter chamber 54, the master cylinder pressure PmL is supplied to the servo pressure passage 41 via the first master passage 23, the first master cut valve 65, the master pilot passage 23P, the bypass passage 39, and the bypass check valve 66 as indicated by dotted bold arrows in FIG. 4. In this case, the master cylinder pressure PmL is directly supplied to the wheel cylinders 82FL and 82FR for the left and right front wheels.

In the case where the master cylinder pressure PmL is smaller than the activatable pressure of the pressure-increasing device 50 because of weak depression force on the brake pedal by the driver, though the accumulator pressure Pacc is higher than the activatable pressure of the pressure-increasing device 50, the servo pressure is not outputted from the pressure-increasing device 50, but the master cylinder pressure PmL is directly supplied to the servo pressure passage 41.

Figure 5:
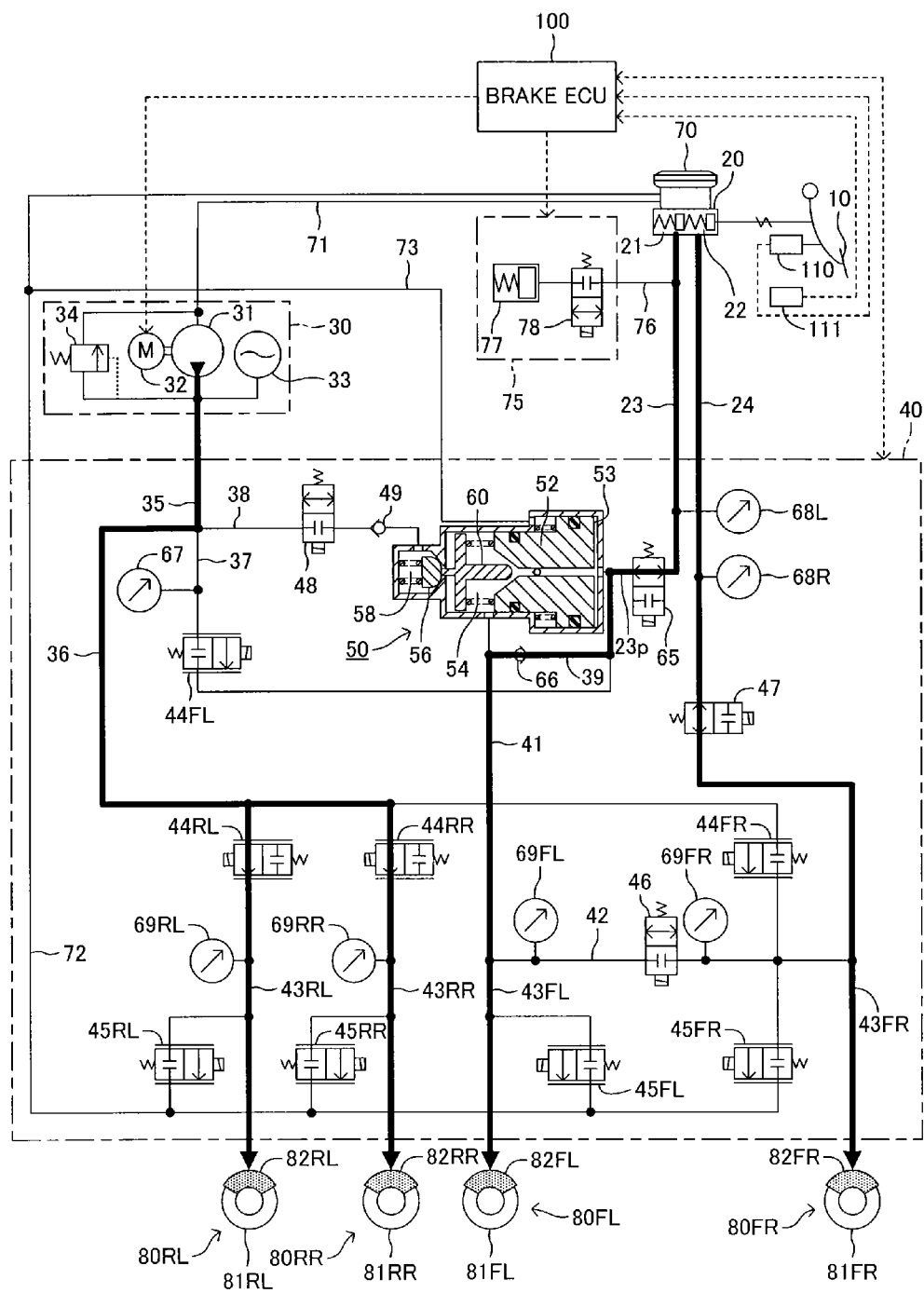
FIG. 5 is an explanatory view illustrating a hydraulic pressure supply passage according to the first embodiment, when abnormal leakage of operating fluid occurs.

The case where abnormal leakage of operating fluid is detected will be described next. When detecting abnormal leakage of operating fluid, the brake ECU 100 opens the first master cut valve 65 and the second master cut valve 47, and closes the pressure-increase cut valve 48, the simulator cut valve 78, the front-wheel communication on-off valve 46, the pressure-increasing linear control valves 44FL and 44FR for the left and right front wheels, and the pressure-decreasing linear control valves 45FL and 45FR for the left and right rear wheels, as illustrated in FIG. 5. The brake ECU 100 also executes the hydraulic control for the pressure-increasing linear control valves 44RL and 44RR for the left and right rear wheels, and the pressure-decreasing linear control valves 45RL and 45RR for the left and right rear wheels. With this, a front-right-wheel master brake system in which the wheel cylinder 82FR for the front-right wheel and the second pressure chamber 22 in the master cylinder 20 communicate with each other is formed as illustrated by bold arrows in FIG. 5. Since the function of the pressure-increasing device 50 is stopped due to the pressure-increase cut valve 48 that keeps closed, a left-front-wheel master brake system in which the wheel cylinder 82FL for the front-left wheel and the first pressure chamber 21 in the master cylinder 20 communicate with each other is formed. As for the rear wheels, a rear-wheel accumulator brake system in which the accumulator pressure Pacc outputted from the power hydraulic pressure generating device 30 is adjusted to be supplied to each of two wheel cylinders 82RL and 82RR is formed. In this case, the pressure-increasing linear control valves 44FL and 44FR and the pressure-decreasing linear control valves 45FL and 45FR for the left and right front wheels, the pressure-increase cut valve 48, and the front-wheel communication on-off valve 46 are kept closed. Therefore, three brake systems are maintained to be independent from one another, i.e., maintained to be in the condition in which communication among these brake systems is shut off. With this, even if leakage of operating fluid occurs on at least one of the three brake systems, the operating fluid in the other brake systems does not flow into the brake system in which the operating fluid leaks. This can prevent the other brake systems from being affected. Specifically, this configuration can prevent the brake systems having no leakage of operating fluid from wasting the operating fluid.

In this control state, the master cylinder pressures PmL and PmR are generated by the master cylinder 20 by using the force of the driver's depression operation on the brake pedal 10, and these master cylinder pressures PmL and PmR are supplied to the wheel cylinders 82FL and 82FR for the front wheels, whereby braking force according to the driver's operation on the brake pedal can be generated on the front wheels. As for the rear wheels, the target hydraulic pressure according to the driver's operation on the brake pedal is set, and the pressure-increasing linear control valves 44RL and 44RR and the pressure-decreasing linear control valves 45RL and 45RR are controlled such that the wheel cylinder pressures PwRL and PwRR for the rear wheels follow the target hydraulic pressure.

Figure 6:
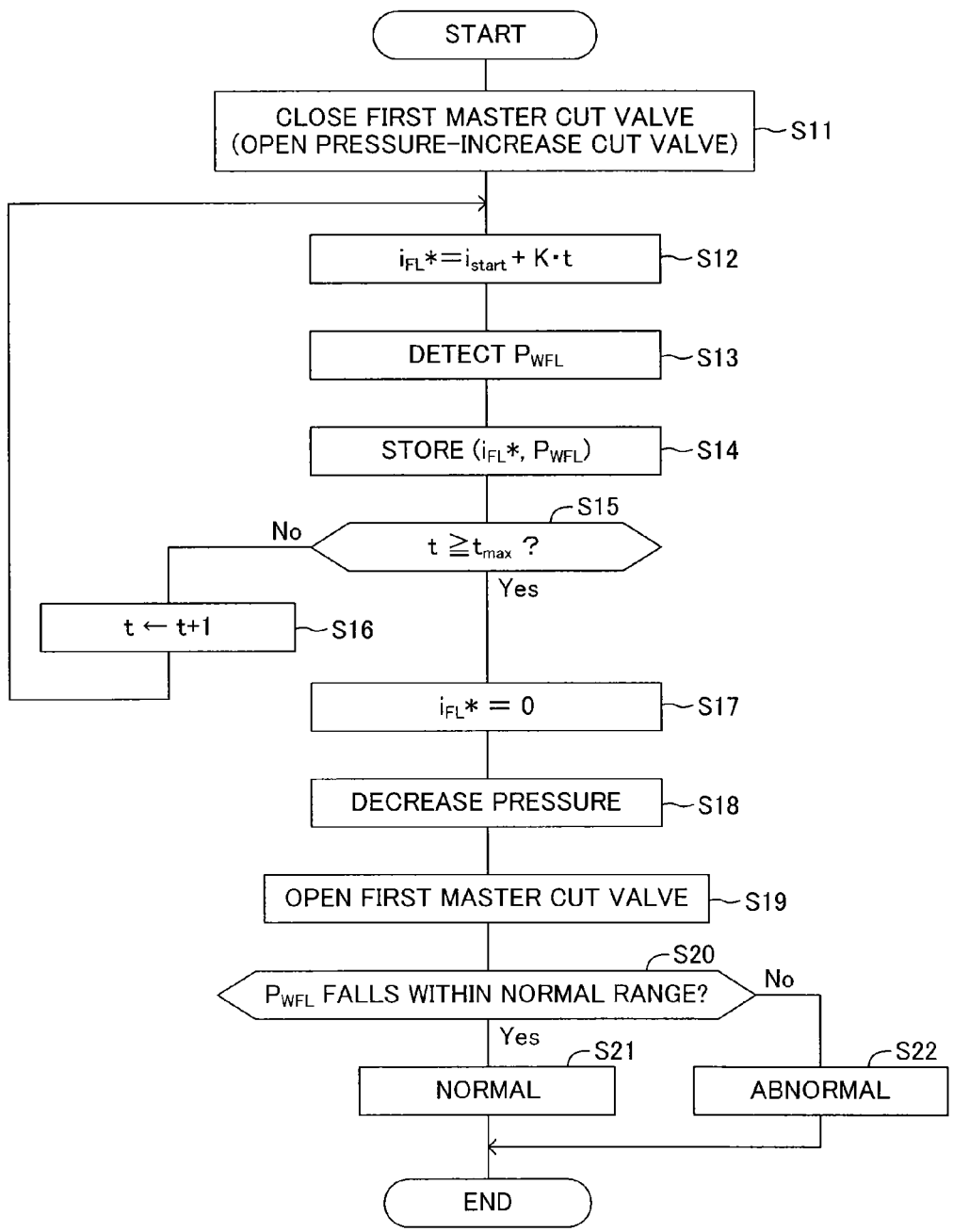
FIG. 6 is a flowchart illustrating an activation check routine according to the first embodiment.

The activation check of the pressure-increasing device 50 will be described next. This activation check is started when the brake ECU 100 is started, or the ignition switch is changed from on to off. Since the activation check does not need the driver's operation on the brake pedal, the activation check can be started at any appropriate timing other than the timing described above. FIG. 6 illustrates an activation check routine executed by the brake ECU 100.

When the activation check routine is started, the brake ECU 100 energizes the solenoid of the first master cut valve 65 to close the first master cut valve 65 in step S11. The other valves take the original positions illustrated in FIG. 1. Therefore, the pressure-increase cut valve 48 that is a normally opened solenoid valve keeps opened. Then, in step S12, the brake ECU 100 sets a target current iFL* for the pressure-increasing linear control valve 44FL for adjusting the hydraulic pressure of the wheel cylinder 82FL for the front-left wheel from the equation described below, and applies the set target current iFL* to the solenoid of the pressure-increasing linear control valve 44FL.

$$iFL^* = i\,\text{start} + K \cdot t$$

Here, i start indicates a current initial value. The current initial value i start can be set to any value, but in the present embodiment, the valve-opening current i open for the pressure-increasing linear control valve 44FL is used. Therefore, the valve-opening current i open corresponding to the differential pressure ΔP between the accumulator pressure Pacc detected by the accumulator pressure sensor 67 and the wheel cylinder pressure PwFL detected by the wheel cylinder pressure sensor 69FL is set as the current initial value i start. K is a current increase coefficient set beforehand. t is a timer value for counting an elapsed time after the start of the energization, and its initial value is set to zero.

Accordingly, just after the activation check routine is started, the valve-opening current is applied to the pressure-increasing linear control valve 44FL in step S12. Then, in step S13, the brake ECU 100 reads the wheel cylinder pressure PwFL detected by the wheel cylinder pressure sensor 69FL. This process corresponds to a process of detecting the hydraulic pressure (servo pressure) outputted from the pressure-increasing device 50. At the time at which the process in step S13 is executed first, the valve-opening current i open is applied to the solenoid of the pressure-increasing linear control valve 44FL. Therefore, the hydraulic pressure of the pilot unit 53 in the pressure-increasing device 50 does not reach the activation start pressure. Accordingly, in this case, the wheel cylinder pressure PwFL detected in step S13 is equal to the pilot pressure of the pressure-increasing device 50.

Next, in step S14, the brake ECU 100 stores data (iFL*, PwFL) in which the target current iFL* that is a current value applied to the solenoid of the pressure-increasing linear control valve 44FL and the wheel cylinder pressure PwFL detected by the wheel cylinder pressure sensor 69FL during the application of the target current are associated with each other. In step S15, the brake ECU 100 determines whether or not the timer value t reaches a check end value tmax. When the timer value does not reach the check end value tmax, the brake ECU 100 increments the timer value t by "1" in step S16, and returns to step S12.

Figure 7:
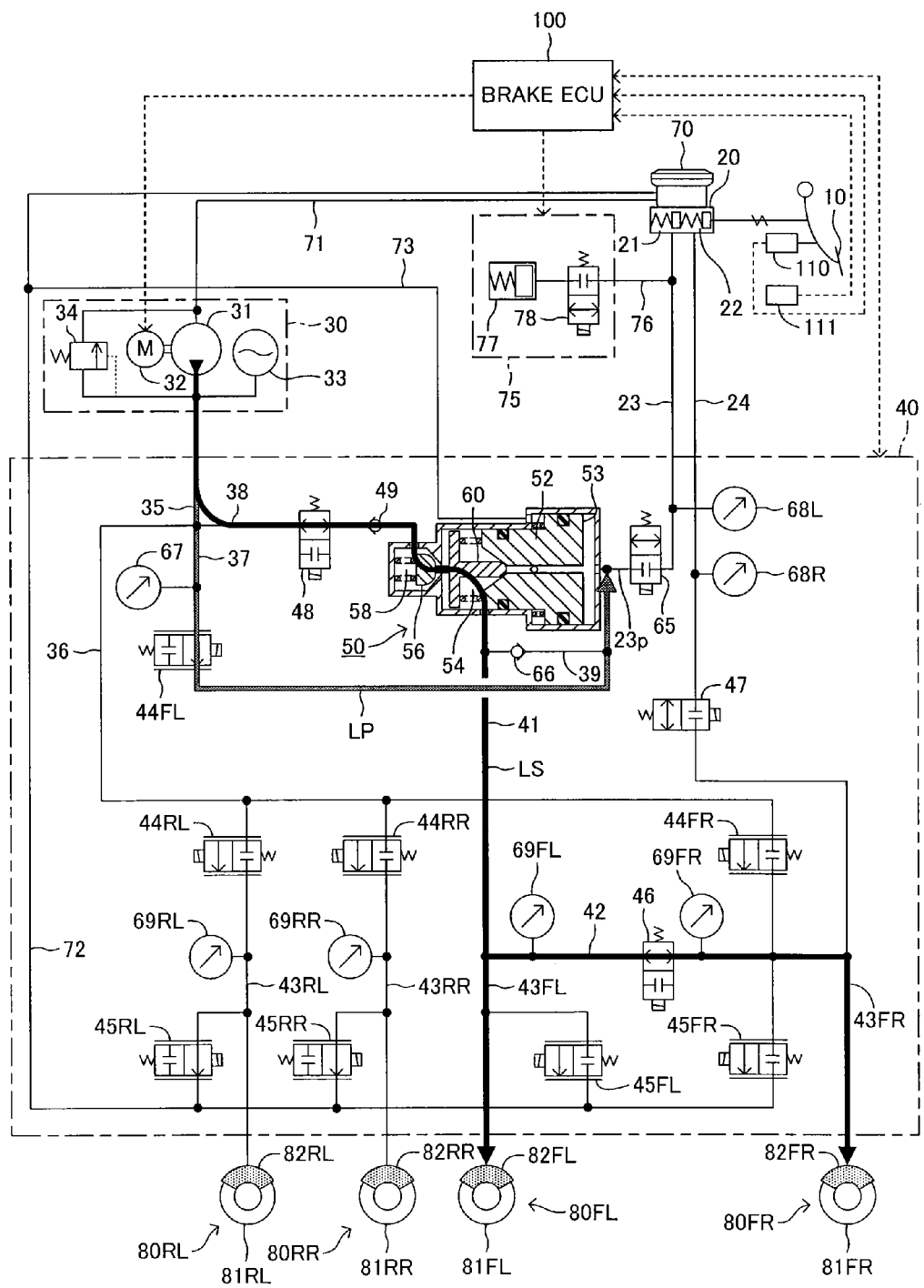
FIG. 7 is an explanatory view illustrating a pilot pressure supply passage and a servo pressure supply passage during the activation check according to the first embodiment.

The repeated execution of the process described above increases the energization amount of the pressure-increasing linear control valve 44FL, whereby the pilot pressure that is the hydraulic pressure outputted from the pressure-increasing linear control valve 44FL increases. The hydraulic pressure (servo pressure) outputted from the pressure-increasing device 50 is equal to the pilot pressure until the pilot pressure reaches the activation start pressure of the pressure-increasing device 50. When the pilot pressure exceeds the activation start pressure of the pressure-increasing device 50, high-pressure operating fluid is supplied to the small-diameter chamber 54 from the high-pressure chamber 58 to increase the hydraulic pressure in the small-diameter chamber 54, if the pressure-increasing device 50 is normal. Accordingly, the servo pressure assumes a value larger than the pilot pressure with the predetermined pressure-increase ratio. This servo pressure is supplied to the wheel cylinders 82FL and 82FR for the left and right front wheels. The brake ECU 100 continues to sample the wheel cylinder pressure PwFL (may be the wheel cylinder pressure PwFR) during the energization of the pressure-increasing linear control valve 44FL. FIG. 7 illustrates a supply passage LP of the pilot pressure and a supply passage LS of the servo pressure, when the pressure-increasing device 50 is properly activated.

After the timer value t reaches the check end value tmax (S15: Yes), the brake ECU 100 ends the energization of the pressure-increasing linear control valve 44FL in step S17, and opens the pressure-decreasing linear control valves 45FL and 45FR to allow the operating fluid in the wheel cylinders 82FL and 82FR for the front wheels to flow through the return passage 72 in order to decrease the wheel cylinder pressure to the atmospheric pressure in step S18. Then, the brake ECU 100 returns all valves to the original positions in step S19. In this case, the first master cut valve 65 is returned to its open state.

Figure 8:
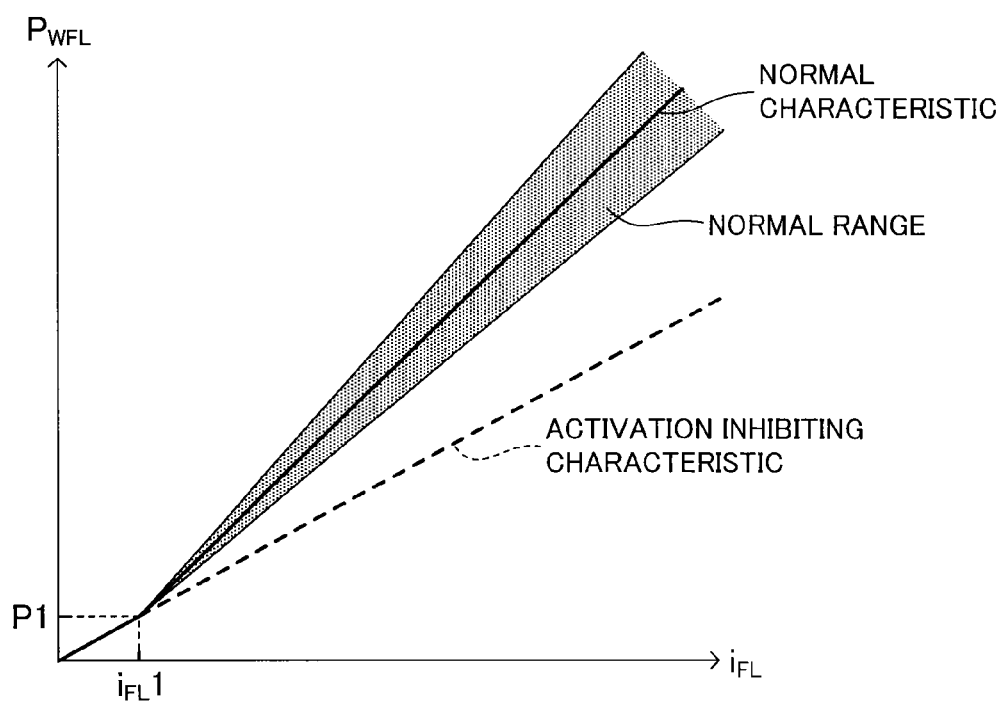
FIG. 8 is a graph illustrating operation characteristics of the pressure-increasing device.

In step S20, the brake ECU 100 determines whether the pressure-increasing device 50 is normally activated or not based on the sampling data (iFL*, PwFL). FIG. 8 illustrates the relationship between the energization amount iFL (corresponding to the target current iFL*) of the pressure-increasing linear control valve 44FL and the wheel cylinder pressure PwFL. In FIG. 8, a bold line indicated by a solid line represents normal characteristic when the pressure-increasing device 50 is normally activated. A bold line indicated by a dotted line represents a characteristic with the pressure-increase cut valve 48 being closed, i.e., an activation inhibiting characteristic when the activation of the pressure-increasing device 50 is inhibited. The activation inhibiting characteristic represents a relationship between the energization amount of the pressure-increasing linear control valve 44FL and the outputted hydraulic pressure. A region painted with gray indicates a normal range where the activation of the pressure-increasing device 50 is determined to be normal.

When the current iFL (=target current iFL*) applied to the pressure-increasing linear control valve 44FL exceeds an activation start current iFL1 by which the pilot pressure becomes the activation start pressure P1 of the pressure-increasing device 50 during the normal activation of the pressure-increasing device 50, the increase coefficient of the wheel cylinder pressure PwFL (servo pressure) relative to the increase in the current iFL becomes larger than the increase coefficient of the pilot pressure relative to the increase in the current iFL from this point. Accordingly, the characteristic indicated by the solid line in FIG. 8 is obtained. Consequently, if the sampling data (iFL*, PwFL) is moved on the line of the normal characteristic indicated by the solid line in FIG. 8, the brake ECU 100 determine that the pressure-increasing device 50 is normally activated. The brake ECU 100 includes a non-volatile memory that stores various data pieces. The brake ECU 100 stores data that is measured beforehand and that indicates a normal characteristic into this non-volatile memory. The brake ECU 100 performs the activation check of the pressure-increasing device 50 by using the normal characteristic data. In this case, as illustrated in FIG. 8, a region formed by adding a predetermined allowable value to the normal characteristic line is set as the normal range, considering a measurement error in the normal characteristic and a measurement error in the sampling data. The e normal characteristic data stored in the non-volatile memory may be data from which the normal characteristic can be derived. The non-volatile memory does not always have to store data directly indicating the normal characteristic, and may store data indicating the activation inhibiting characteristic and a difference between the activation inhibiting characteristic and the normal characteristic, for example.

In step S20, the brake ECU 100 compares the normal characteristic data and the actually sampling data to determine whether the sampling data falls within the normal range or not. When the sampling data falls within the normal range, the brake ECU 100 determines in step S21 that the activation of the pressure-increasing device 50 is normal, and when the sampling data is outside the normal range, the brake ECU 100 determines in step S22 that the activation of the pressure-increasing device 50 is abnormal. The brake ECU 100 stores the result of this activation check of the pressure-increasing device 50 into the non-volatile memory, and then, ends the activation check routine.

The above-mentioned brake control device according to the first embodiment includes the pilot input passage 37, adjusts the hydraulic pressure outputted from the power hydraulic pressure generating device 30 to the activation check hydraulic pressure by the pressure-increasing linear control valve 44FL, and supplies the adjusted hydraulic pressure to the pilot unit 53 of the pressure-increasing device 50. This configuration can implement the activation check of the pressure-increasing device 50 without relying on the driver's operation on the brake pedal. The brake control device according to the first embodiment uses the pressure-increasing linear control valve 44FL for both the hydraulic control of the wheel cylinder 82FL and for the control of the pilot pressure. This configuration eliminates a need to exclusively provide a pressure adjusting valve for controlling the pilot pressure, and can be implemented with low cost.

Since the pilot pressure is controlled by using the pressure-increasing linear control valve 44FL, the activation check can accurately be performed. In addition, the activation check can be performed without relying on the driver's operation on the brake pedal, whereby a degree of freedom of a check timing is increased.

The servo pressure passage 41 not only communicates with the wheel cylinder 82FL for the front-left wheel, but also joins the individual passage 43FR that is the downstream passage of the pressure-increasing linear control valve 44FR for the front-right wheel via the front-wheel left-right communication passage 42 and the normally opened front-wheel communication on-off valve 46. The pressure-increasing linear control valves 44FL and 44FR, and the second master cut valve 47 are a normally closed valve, while the first master cut valve 65 and the pressure-increase cut valve 48 are a normally opened valve. With this configuration, the servo pressure can surely be supplied to the wheel cylinders 82FL and 82FR for the left and right front wheels, even if something abnormal occurs on the control system.

The wheel cylinders 82FL and 82FR for the left and right front wheels can be communicated with each other via the front-wheel left-right communication passage 42 and the front-wheel communication on-off valve 46. Accordingly, when either one of the pressure-increasing linear control valves 44FL and 44FR controlling the wheel cylinder pressure of the front wheels is in failure, the wheel cylinder pressures for both of left and right wheels can commonly be controlled by using the other pressure-increasing linear control valve 44FL (44FR) that is not in failure. In the normal brake control, the target hydraulic pressures for the wheel cylinders 82FL and 82FR of the left and right wheels are set to the same value, whereby it is all right to control the hydraulic pressures of two wheel cylinders 82FL and 82FR with one pressure-increasing linear control valve 44FL (44FR). For example, when detecting abnormality on either one of the pressure-increasing linear control valves 44FL and 44FR for the left and right front wheels by the abnormality detecting routine, the brake ECU 100 keeps the front-wheel communication on-off valve 46 opened to control the energization of the pressure-increasing linear control valve 44FL (44FR) that is not detected as abnormal, in order that the wheel cylinder pressure PwFL or the wheel cylinder pressure PwFR follows the target hydraulic pressure P*. With this control, the capability to cope with failure can be enhanced.

Figure 9:
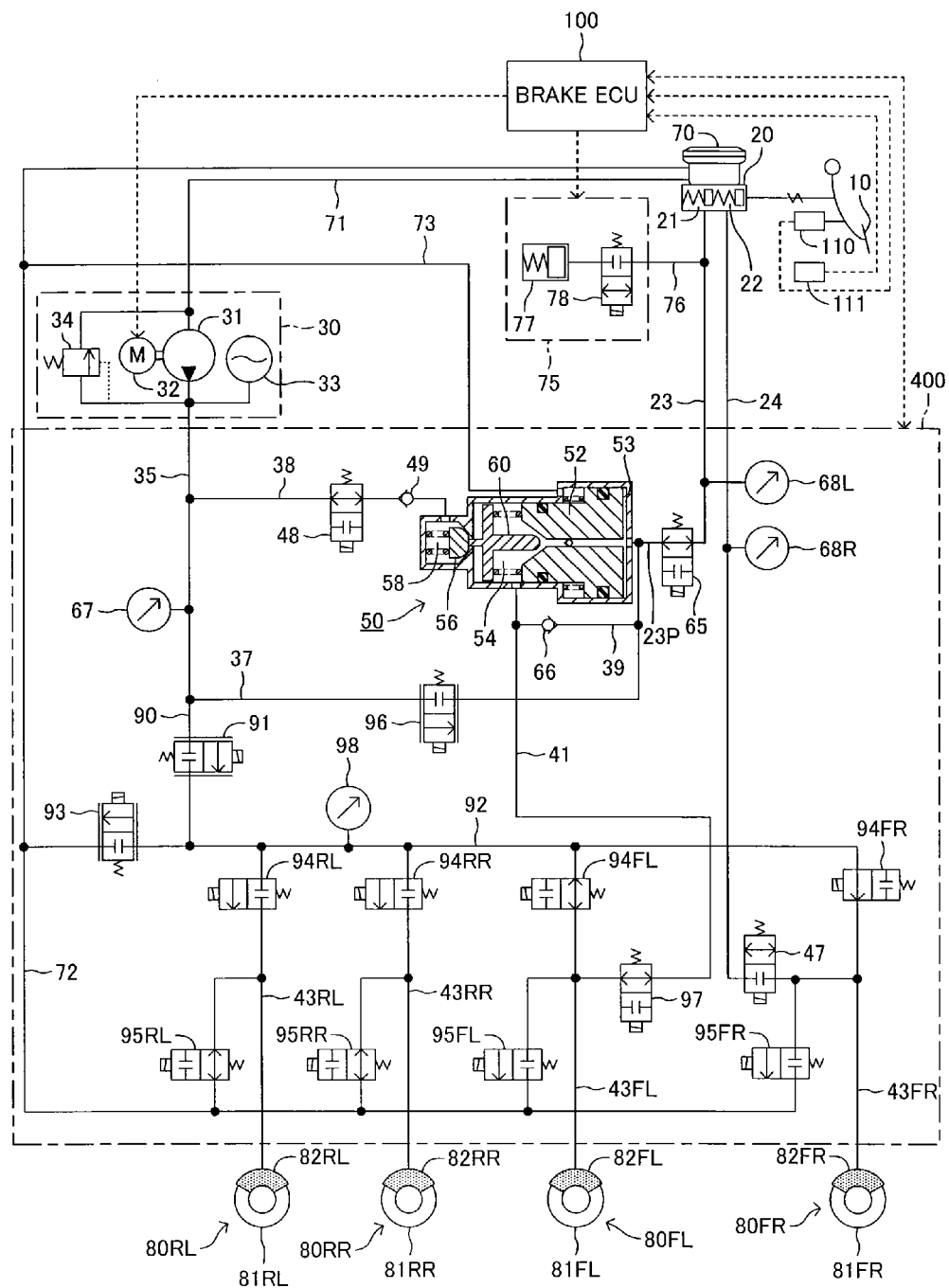
FIG. 9 is a diagram illustrating a schematic system configuration of a vehicle brake control device according to a second embodiment of the present invention.

A vehicle brake control device according to a second embodiment will be described next. FIG. 9 is a diagram illustrating a schematic system configuration of a vehicle brake control device according to the second embodiment. The brake control device according to the second embodiment includes a brake actuator 400 instead of the brake actuator 40 in the brake control device according to the first embodiment. The other configuration is the same as the first embodiment. Therefore, the components similar to those in the brake control device according to the first embodiment are identified by the same reference numerals, and their description will not be repeated.

The brake actuator 400 in the brake control device according to the second embodiment will be described. The brake actuator 400 includes a main passage 90 communicating with an accumulator passage 35, a pilot input passage 37, a high-pressure supply passage 38, a return passage 72 communicating with a reservoir 70, and four individual passages 43FL, 43FR, 43RL, and 43RR communicating with each of wheel cylinders 82FL, 82FR, 82RL, and 82RR. A main normally closed pressure-increasing linear control valve 91 that keeps closed when a solenoid is not energized is provided on the main passage 90. The downstream side of the main passage 90 from the main pressure-increasing linear control valve 91 is referred to as a common passage 92 to distinguish the downstream side from the upstream side. The common passage 92 and the return passage 72 are connected via a normally closed pressure-decreasing linear control valve 93.

The brake actuator 400 also includes holding valves 94FL, 94FR, 94RL, and 94RR, and connects the common passage 92 and the individual passages 43FL, 43FR, 43RL, and 43RR via the holding valves 94FL, 94FR, 94RL, and 94RR. The holding valves 94RL and 94RR communicating with the wheel cylinders 82RL and 82RR for the left and right rear wheels are a normally closed solenoid valve that keeps closed when its solenoid is not energized, while the holding valves 94FL and 94FR communicating with the wheel cylinders 82FL and 82FR for the left and right front wheels are a normally opened solenoid valve that keeps opened when its solenoid is not energized. The holding valve 94FL allows the bidirectional flow of the operating fluid when it is opened, and the other holding valves 94FR, 94RL, and 94RR allow only the flow of the operating fluid toward the wheel cylinders 82FR, 82RL, and 82RR when they are opened.

The brake actuator 400 also includes pressure-decreasing valves 95FL, 95FR, 95RL, and 95RR, and connects the return passage 72 and the individual passages 43FL, 43FR, 43RL, and 43RR via the pressure-decreasing valves 95FL, 95FR, 95RL, and 95RR. The pressure-decreasing valves 95RL and 95RR communicating with the wheel cylinders 82RL and 82RR for the left and right rear wheels are a normally opened solenoid valve that keeps opened when its solenoid is not energized. The pressure-decreasing valves 95FL and 95FR communicating with the wheel cylinders 82FL and 82FR for the left and right front wheels are a normally closed solenoid valve that keeps closed when its solenoid is not energized.

The holding valves 94 and the pressure-decreasing valves 95 are controlled to be opened and closed by the brake ECU 100 during an execution of an antilock brake control that prevents a lock of wheels by decreasing wheel cylinder pressure in the case where a wheel is locked to be slipped. During the normal hydraulic control, the holding valve 94 is kept opened, and the pressure-decreasing valve 95 is kept closed.

The brake actuator 400 also includes a pressure-increasing device 50; and a high-pressure supply passage 38, a pressure-increase cut valve 48, a high-pressure supply passage check valve 49, a servo pressure passage 41, a bypass passage 39, a first master passage 23, a first master cut valve 65, and a pilot input passage 37, those of which relate to the activation of the pressure-increasing device 50. Although these components are similar to the first embodiment, the pilot input passage 37 has formed thereon a pilot pressure adjusting linear control valve 96 that is a normally closed solenoid linear control valve keeping closed when its solenoid is not energized. A hydraulic pressure adjusted by the pilot pressure adjusting linear control valve 96 is supplied to the pilot unit 53 (large-diameter chamber 53) of the pressure-increasing device 50. A downstream master cut valve 97 is provided on the servo pressure passage 41. The downstream master cut valve 97 is a normally opened solenoid valve that keeps opened when its solenoid is not energized. When the downstream master cut valve 97 is closed, the flow of the operating fluid between the small-diameter chamber 54 of the pressure-increasing device 50 and the wheel cylinder 82FL for the front-left wheel is cut off, and when the downstream master cut valve 97 is opened, the flow of the operating fluid between the small-diameter chamber 54 and the wheel cylinder 82FL for the front-left wheel is allowed in both directions. The pilot input passage 37 is connected to the accumulator passage 35 at the upstream side of the main pressure-increasing linear control valve 91, and the downstream side (output unit) of the main pressure-increasing linear control valve 91 is not connected to the pilot unit 53 of the pressure-increasing device 50.

As in the first embodiment, the brake actuator 400 also includes a second master passage 24, and a second master cut valve 47 provided to the second master passage 24. The second master passage 24 connects the second pressure chamber 22 in the master cylinder 20 and the individual passage 43FR for the front-right wheel via the second master cut valve 47.

As in the first embodiment, the brake actuator 400 also includes an accumulator pressure sensor 67 that detects an accumulator pressure Pacc, a master cylinder pressure sensor 68L that detects a master cylinder pressure PmFL, and a master cylinder pressure sensor 68R that detects a master cylinder pressure PmFR. The brake actuator 400 also includes a control pressure sensor 98 that detects a hydraulic pressure Px on the common passage 92. The brake control device according to the second embodiment supplies the hydraulic pressure adjusted by the pair of the main pressure-increasing linear control valve 91 and the pressure-decreasing linear control valve 93 to all of the wheel cylinders 82 for four wheels. Therefore, the hydraulic pressure of each wheel cylinder 82 can be detected by the control pressure sensor 98. The hydraulic pressure detected by the control pressure sensor 98 is referred to as a control pressure Px below.

Figure 10:
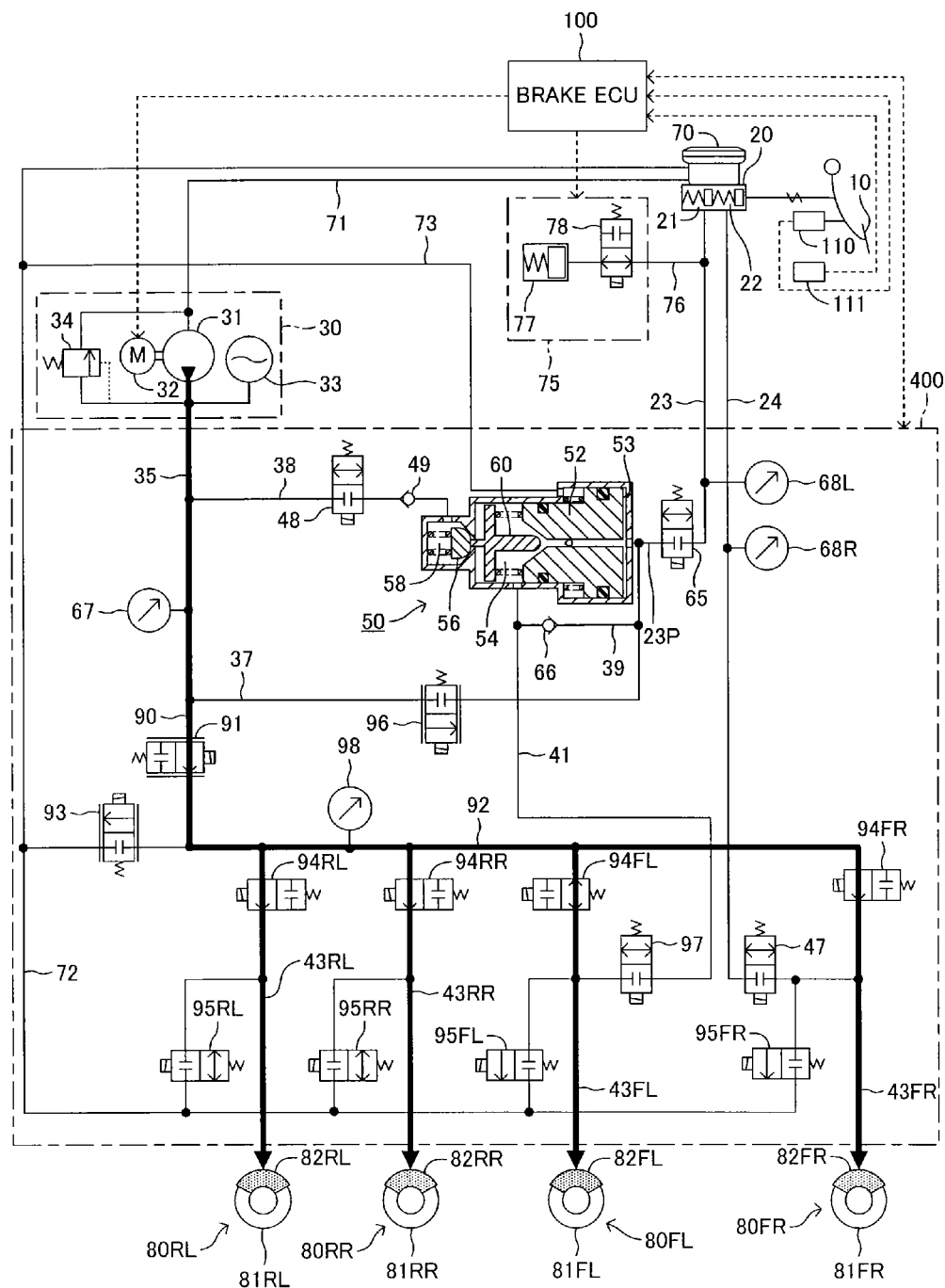
FIG. 10 is an explanatory view illustrating a hydraulic pressure supply passage during a hydraulic control according to the second embodiment.

A brake control executed by the brake ECU 100 according to the second embodiment will be described next. Firstly, a brake control in the case where the brake control device is normal (in the case where there is no suspected leakage of the operating fluid, or in the case where something abnormal does not occur in the control system) will be described. The brake ECU 100 keeps the two master cut valves 65 and 47, the downstream master cut valve 97, the pressure-increase cut valve 48, the four pressure-decreasing valves 95FL, 95FR, 95RL, and 95RR, and the pilot pressure adjusting linear control valve 96 closed, and keeps the four holding valves 94FL, 94FR, 94RL, and 94RR and the simulator cut valve 78 opened, in order to control an energization amount of the main pressure-increasing linear control valve 91 and the pressure-decreasing linear control valve 93. With this control, the brake ECU 100 disables the pressure-increasing device 50, thereby being capable of controlling the hydraulic pressure of each wheel cylinder 82. In this case, the brake ECU 100 calculates a target hydraulic pressure P* common to each wheel cylinder 82 based on requested hydraulic braking force, and controls a drive current of the main pressure-increasing linear control valve 91 and the pressure-decreasing linear control valve 93 by a feedback control so as to cause the control pressure Px detected by the control pressure sensor 98 to be equal to the target hydraulic pressure P. For the hydraulic control, a target current i* is calculated based on a deviation between the control pressure Px and the target hydraulic pressure P*, and this target current i* is flown through the main pressure-increasing linear control valve 91 or the pressure-decreasing linear control valve 93, as in the first embodiment. FIG. 10 illustrates a hydraulic supply path upon the increase in each wheel cylinder pressure by the hydraulic control described above, the hydraulic supply path being indicated by bold arrows.

Figure 11:
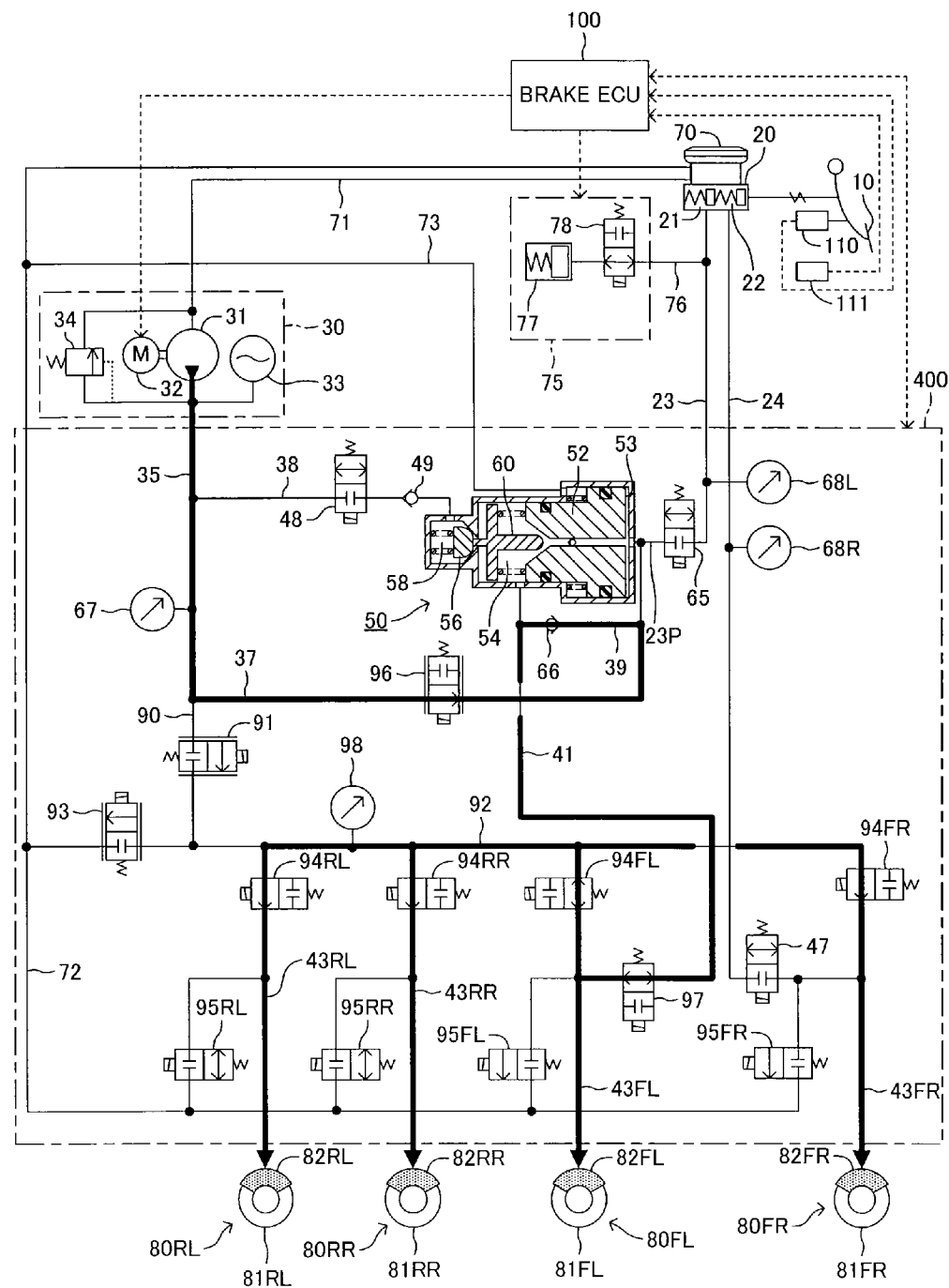
FIG. 11 is an explanatory view illustrating a hydraulic pressure supply passage during a hydraulic control according to the second embodiment.

Since the servo pressure passage 41 is connected to the passage at the downstream side of the main pressure-increasing linear control valve 91, the hydraulic pressure of each wheel cylinder 82 can be controlled by using the pilot pressure adjusting linear control valve 96 instead of the main pressure-increasing linear control valve 91. In this case, the brake ECU 100 keeps the main pressure-increasing linear control valve 91 closed, and keeps the downstream master cut valve 97 opened. The brake ECU 100 does not change the activation of the pressure-decreasing linear control valve 93. With this, the hydraulic pressure adjusted by the pilot pressure adjusting linear control valve 96 is supplied to the common passage 92 via the pilot input passage 37, the bypass passage 39, the bypass check valve 66, the servo pressure passage 41, the downstream master cut valve 97, and the holding valve 94FL with the activation of the pressure-increasing device 50 being restricted, as illustrated in FIG. 11. Accordingly, the main pressure-increasing linear control valve 91 can be deactivated. In this case, the hydraulic control can be executed by alternately switching the main pressure-increasing linear control valve 91 and the pilot pressure adjusting linear control valve 96 at a timing set beforehand, for example. Every time the brake pedal operation is canceled, the main pressure-increasing linear control valve 91 and the pilot pressure adjusting linear control valve 96 may alternately be used as a pressure-increasing linear control valve activated upon the next brake pedal operation, for example. In this case, during the period in which the pilot pressure adjusting linear control valve 96 is activated, the brake ECU 100 opens the downstream master cut valve 97, and during the period in which the main pressure-increasing linear control valve 91 is activated, the brake ECU 100 closes the downstream master cut valve 97. With this control, the main pressure-increasing linear control valve 91 can be assisted by using the pilot pressure adjusting linear control valve 96, whereby the life of the main pressure-increasing linear control valve 91 can be prolonged. It may be configured such that, when the main pressure-increasing linear control valve 91 is in failure, the hydraulic control for four wheels can be executed by using the pilot pressure adjusting linear control valve 96 instead of the main pressure-increasing linear control valve 91. This configuration can enhance capability to cope with failure.

The main pressure-increasing linear control valve 91 and the pilot pressure adjusting linear control valve 96 may be simultaneously activated. For example, the brake ECU 100 determines whether or not operating fluid is required to be flown through the common passage 92 with a large flow rate, and when determining that the operating fluid is required to be flown with a large flow rate, the brake ECU 100 keeps the downstream master cut valve 97 opened to simultaneously activate the main pressure-increasing linear control valve 91 and the pilot pressure adjusting linear control valve 96. In this case, the brake ECU 100 may determine whether or not the operating fluid is required to be flown with a large flow rate based on whether or not the deviation (P*−Px) between the target hydraulic pressure P* and the control pressure Px, or its integrated value, or its derivative value is larger than a simultaneous use threshold value. With this process, the main pressure-increasing linear control valve 91 can be assisted by using the pilot pressure adjusting linear control valve 96, whereby the specification of the main pressure-increasing linear control valve 91 can be formed as a type for a small flow rate.

Next, the case where abnormality on the control system is detected will be described. When detecting abnormality on the control system, the brake ECU 100 stops energization of all electric actuators (control valves, motors), as in the first embodiment. With this, the solenoid control valves (solenoid valves, solenoid linear control valves) are returned to their original position. In this case, the first master cut valve 65 that is a normally opened valve is opened, so that the first pressure chamber 21 in the master cylinder 20 and the large-diameter chamber 53 (pilot unit 53) of the pressure-increasing device 50 are communicated with each other. In addition, the pressure-increase cut valve 48 that is a normally opened valve is opened, so that the power hydraulic pressure generating device 30 and the high-pressure chamber 58 in the pressure-increasing device 50 are communicated with each other via the high-pressure supply passage check valve 49. In addition, the downstream master cut valve that is a normally opened valve is opened, so that the servo pressure passage 41 and the individual passage 43FL are communicated with each other. In addition, the holding valves 94FL and 94FR for the front wheel, which are a normally opened valve, are opened, so that the common passage 92 and the individual passages 43FL and 43FR for the left and right front wheels are communicated with each other.

Figure 12:
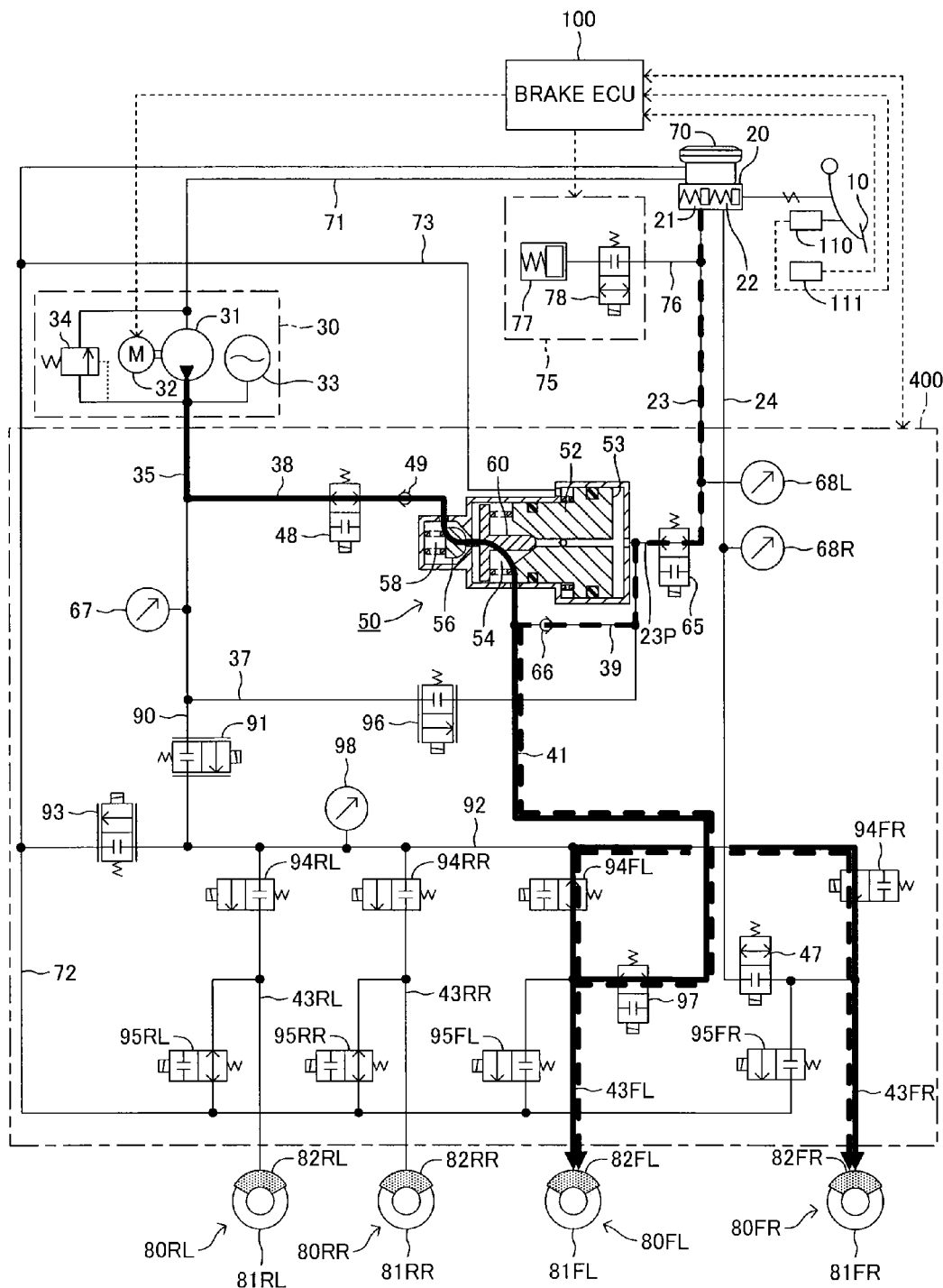
FIG. 12 is an explanatory view illustrating a hydraulic pressure supply passage according to the second embodiment, when a control system has abnormality.

When abnormality occurs on the control system, the activation of the pump 31 in the power hydraulic pressure generating device 30 is stopped. However, when the master cylinder pressure PmL generated by the depression operation on the brake pedal 10 exceeds the activation start pressure in the case where the hydraulic pressure (accumulator pressure Pacc) stored in the accumulator 33 becomes higher than the activatable pressure of the pressure-increasing device 50, the high-pressure supply valve 56 is changed to be opened due to the forward movement of the stepped piston 52, whereby the high-pressure operating fluid is supplied to the small-diameter chamber 54 from the high-pressure chamber 58. With this, the hydraulic pressure (referred to as a servo pressure) with a magnitude obtained by multiplying the master cylinder pressure PmL, which is the pilot pressure supplied to the large-diameter chamber 53, by the pressure-increase ratio (>1) is generated on the servo pressure passage 41. This servo pressure is supplied to the individual passage 43FL for the front-left wheel via the downstream master cut valve 97, and further, supplied to the individual passage 43FR for the front-right wheel via the holding valves 94FL and 94FR for the left and right front wheels. Accordingly, as illustrated by solid bold arrows in FIG. 12, the servo pressure outputted from the pressure-increasing device 50 is supplied not only to the wheel cylinder 82FL for the front-left wheel but also to the wheel cylinder 82FR for the front-right wheel via the common passage 92.

When the accumulator pressure Pacc is decreased to be lower than the activatable pressure of the pressure-increasing device 50, the operating fluid cannot be supplied to the high-pressure chamber 58 from the power hydraulic pressure generating device 30, resulting in that the pressure-increasing device 50 is disabled. In this case, when the master cylinder pressure PmL generated by the driver's depression operation on the brake pedal becomes higher than the hydraulic pressure in the small-diameter chamber 54, the master cylinder pressure PmL is supplied to the servo pressure passage 41 via the first master passage 23, the first master cut valve 65, the master pilot passage 23P, the bypass passage 39, and the bypass check valve 66, as indicated by dotted bold lines in FIG. 12. In this case, the master cylinder pressure PmL is directly supplied to the wheel cylinders 82FL and 82FR for the left and right front wheels.

Figure 13:
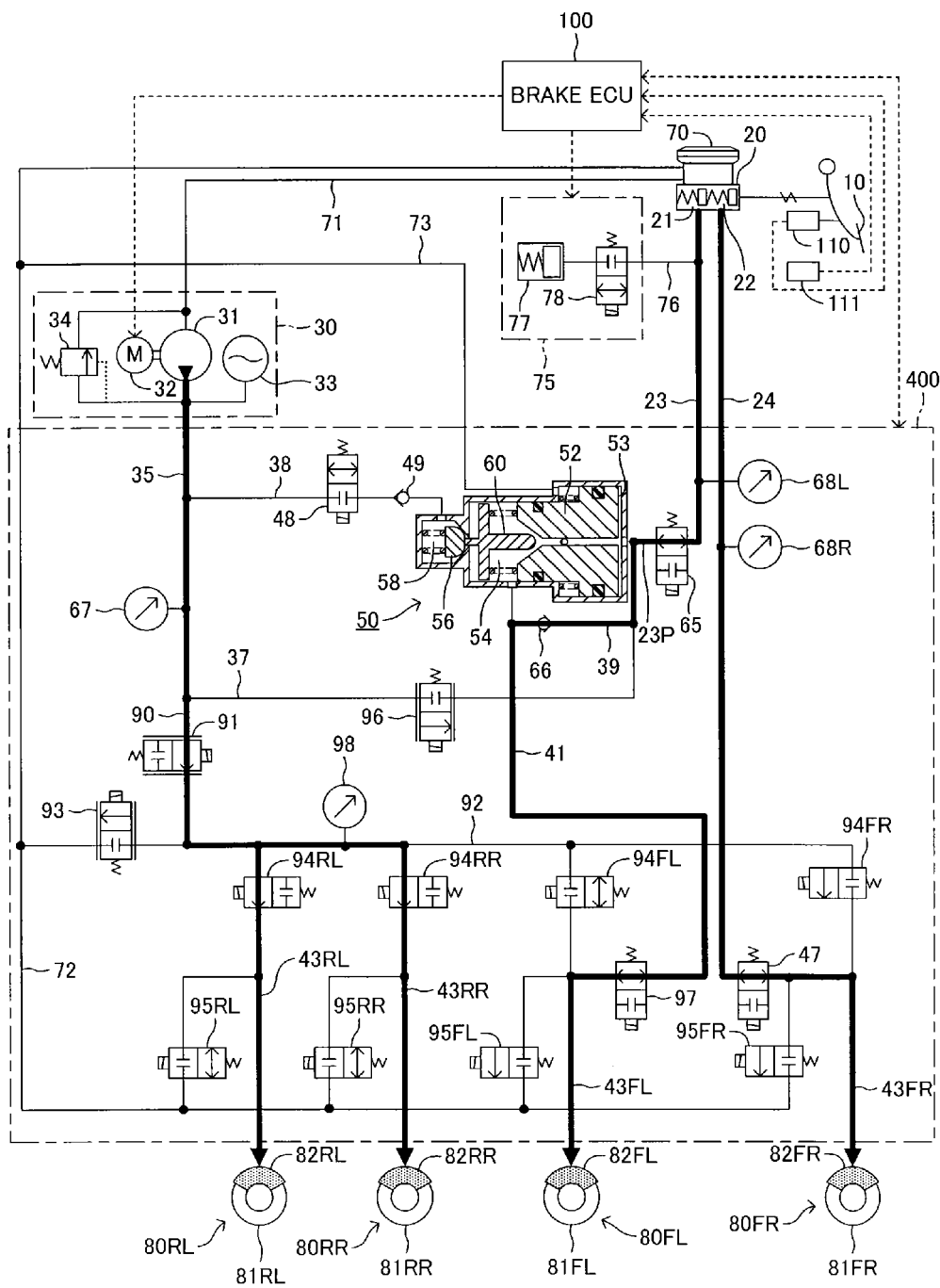
FIG. 13 is an explanatory view illustrating a hydraulic pressure supply passage according to the second embodiment, when abnormal leakage of operating fluid occurs.

Next, the case where an abnormal leakage of the operating fluid is detected will be described. When detecting an abnormal leakage of the operating fluid, the brake ECU 100 keeps the first master cut valve 65, the downstream master cut valve 97, and the second master cut valve 47 opened, and keeps the pilot pressure adjusting linear control valve 96, the pressure-increase cut valve 48, and the simulator cut valve 78 closed, as illustrated in FIG. 13. The brake ECU 100 also keeps the holding valves 94FL and 94FR and the pressure-decreasing valves 95FL and 95FR for the left and right front wheels closed. As for the rear wheels, the brake ECU 100 keeps the holding valves 94RL and 94RR for the left and right rear wheels opened, and keeps the pressure-decreasing valves 95RL and 95RR for the left and right rear wheels closed, as in the normal hydraulic control. With this state, the brake ECU 100 activates the main pressure-increasing linear control valve 91 and the pressure-decreasing linear control valve 93 to control the wheel cylinder pressures of the left and right rear wheels to the target hydraulic pressure.

With this, a front-right wheel master brake system in which the wheel cylinder 82FR for the front-right wheel and the second pressure chamber 21 in the master cylinder 20 communicate with each other is formed as indicated by bold arrows in FIG. 13. Since the pressure-increase cut valve 48 is kept closed to stop the function of the pressure-increasing device 50, a front-left wheel master brake system in which the wheel cylinder 82FL for the front-left wheel and the first pressure chamber 21 in the master cylinder 20 communicate with each other is formed. As for the rear wheels, a rear wheel accumulator brake system in which the accumulator pressure Pacc outputted from the power hydraulic pressure generating device 30 is adjusted and the adjusted pressure is supplied to the two wheel cylinders 82RL and 82RR is formed. In this case, the holding valves 94FL and 94FR and the pressure-decreasing valves 95FL and 95FR for the left and right rear wheels, the pressure-increase cut valve 48, and the pilot pressure adjusting linear control valve 96 are kept closed, resulting in that these three brake systems are kept to be independent, i.e., the three brake systems are kept in a state in which the communication among them is cut off. With this state, even if a leakage of operating fluid occurs on at least one of the three brake systems, operating fluid in the other brake systems is not flown into the brake system having the leakage of the operating fluid, whereby the other brake system can be prevented from being affected.

In this case, it is configured such that the output unit of the main pressure-increasing linear control valve 91 does not communicate with the pilot input passage 37, whereby the three brake systems can be independently formed as described above. Supposing that the main pressure-increasing linear control valve 91 is provided on the accumulator passage 35 at the upstream side of the connection portion between the accumulator passage 37 and the pilot input passage 37, the pilot pressure can be adjusted by the main pressure-increasing linear control valve 91, though the pilot pressure adjusting linear control valve 96 is not provided. However, in this case, three brake systems, in which the adjusted accumulator pressure Pacc is supplied to the wheel cylinders 82RL and 82RR for the rear wheels and the master cylinder pressure is independently supplied to the wheel cylinders 82FL and 82FR for the front wheels, cannot be formed. In view of this, the brake actuator 400 according to the second embodiment is configured such that the main pressure-increasing linear control vale 91 and the pilot pressure adjusting linear control valve 96 are separately formed to prevent the output unit of the main pressure-increasing linear control valve 91 supplying hydraulic pressure to the common passage 92 from communicating with the pilot unit 53 of the pressure-increasing device 50.

Figure 14:
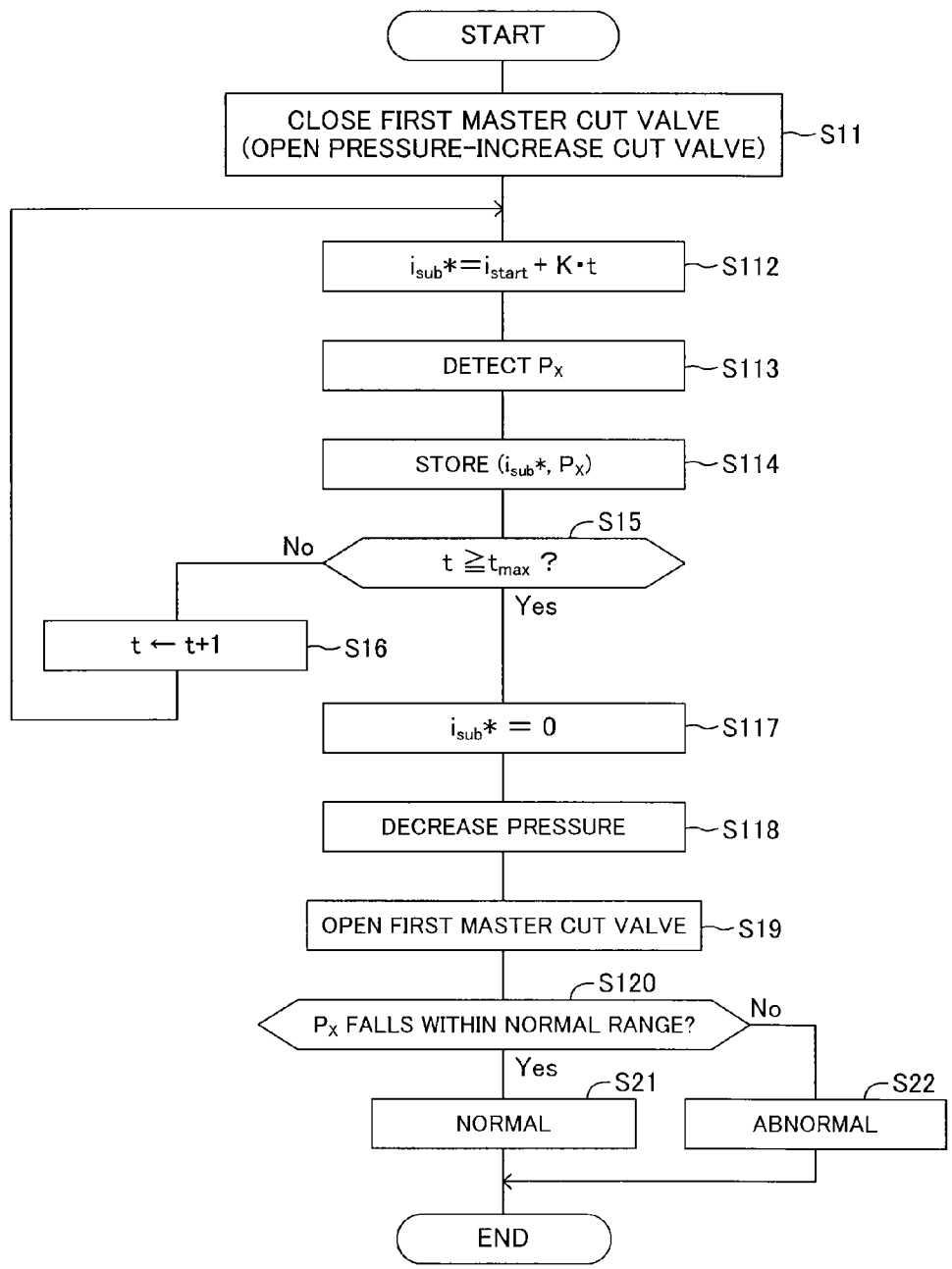
FIG. 14 is a flowchart illustrating an activation check routine according to the second embodiment.

The activation check of the pressure-increasing device 50 will be described next. FIG. 14 illustrates an activation check routine executed by the brake ECU 100 in the second embodiment. The basic principle of this activation check routine is similar to that of the activation check according to the first embodiment. The subject to be controlled is slightly different between the activation check in the second embodiment and the activation check in the first embodiment depending on the difference in components between the brake actuator 40 and the brake actuator 400. Therefore, the processes same as those in the first embodiment are identified by the same reference numerals, and these processes will merely briefly be described.

When the activation check is started, the brake ECU 100 closes the first master cut valve 65 in step S11. The other valves keep their original position illustrated in FIG. 9. Accordingly, the pressure-increase cut valve 48, the downstream master cut valve 97, and the holding valves 94FL and 94FR for the left and right front wheels, which are a normally opened solenoid valve, are opened.

In step S112, the brake ECU 100 sets a target current i sub* for the pilot pressure adjusting linear control valve 96 by the equation described below, and applies the set target current i sub* to the solenoid of the pilot pressure adjusting linear control valve 96.

$$i\,\text{sub}^* = i\,\text{start} + K \cdot t$$

Here, i start indicates a current initial value. The current initial value i start may assume any value, but in the present embodiment, the valve-opening current i open of the pilot pressure adjusting linear control valve 96 is used. Therefore, the valve-opening current i open corresponding to the differential pressure ΔP between the accumulator pressure Pacc detected by the accumulator pressure sensor 67 and the control pressure Px detected by the control pressure sensor 98 is set as the current initial value i start. K and t are similar to the first embodiment.

Then, in step S113, the brake ECU 100 reads the control pressure Px detected by the control pressure sensor 98. This process corresponds to a process of detecting the hydraulic pressure (servo pressure) outputted from the pressure-increasing device 50. Next, in step S114, the brake ECU 100 stores data (i sub*, Px) in which the target current i sub* that is a current value applied to the solenoid of the pilot pressure adjusting linear control valve 96 and the control pressure Px detected by the control pressure sensor 98 during the application of the target current are associated with each other. In step S115, the brake ECU 100 then determines whether or not the timer value t reaches a check end value tmax. When the timer value does not reach the check end value tmax, the brake ECU 100 increments the timer value t by "1" in step S116, and returns to step S112.

Figure 15:
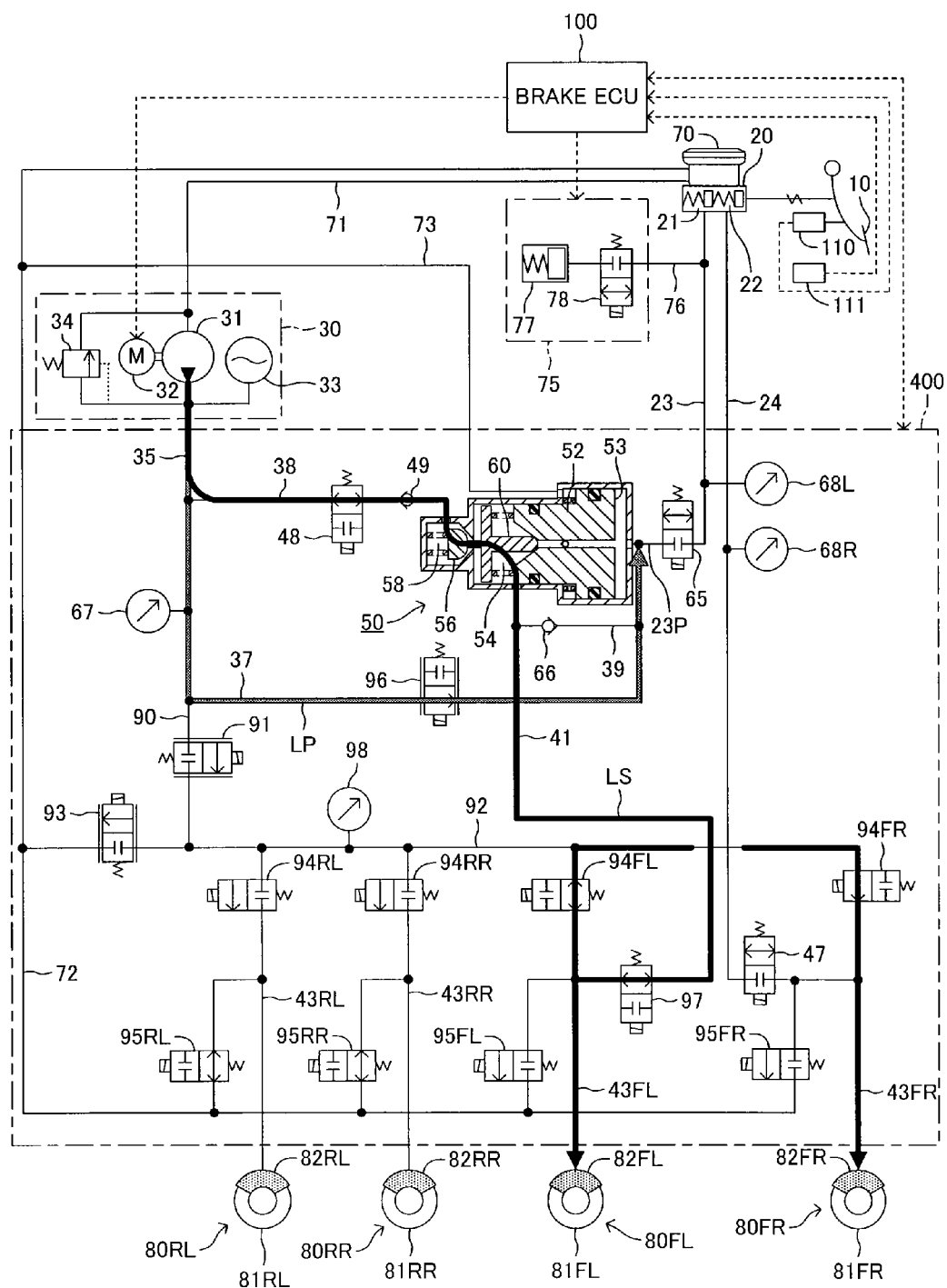
FIG. 15 is an explanatory view illustrating a pilot pressure supply passage and a servo pressure supply passage during the activation check according to the second embodiment.

The repeated execution of the process described above increases the energization amount of the pilot pressure adjusting linear control valve 96, whereby the pilot pressure of the pressure-increasing device 50, which pressure is the hydraulic pressure outputted from the pilot pressure adjusting linear control valve 96, increases. The hydraulic pressure (servo pressure) outputted from the pressure-increasing device 50 is equal to the pilot pressure until the pilot pressure reaches the activation start pressure of the pressure-increasing device 50. When the pilot pressure exceeds the activation start pressure of the pressure-increasing device 50, the high-pressure operating fluid is supplied to the small-diameter chamber 54 from the high-pressure chamber 58 to increase the hydraulic pressure in the small-diameter chamber 54, if the pressure-increasing device 50 is normal. Accordingly, the servo pressure assumes a value larger than the pilot pressure with the predetermined pressure-increase ratio. This servo pressure is supplied to the wheel cylinders 82FL and 82FR for the left and right front wheels. The brake ECU 100 continues to sample the control pressure Px during the energization of the pilot pressure adjusting linear control valve 96. FIG. 15 illustrates a supply passage LP of the pilot pressure and a supply passage LS of the servo pressure, when the pressure-increasing device 50 is properly activated.

After the timer value t reaches the check end value tmax (S15: Yes), the brake ECU 100 ends the energization of the pilot pressure adjusting linear control valve 96 in step S117, and opens the pressure-decreasing valves 95FL and 95FR to allow the operating fluid in the wheel cylinders 82FL and 82FR for the left and right front wheels to flow through the return passage 72 in order to decrease the wheel cylinder pressure to the atmospheric pressure in step S118. Then, the brake ECU 100 returns all valves to their original position in step S119. In this case, the first master cut valve 65 is returned to its open state.

In step S120, the brake ECU 100 determines whether the pressure-increasing device 50 is normally activated or not based on the sampling data (i sub*, Px). In this case, the activation check of the pressure-increasing device 50 is performed by using the normal characteristic data (characteristic data in which a vertical axis in FIG. 8 is replaced by Px and a horizontal axis is replaced by i sub) stored beforehand as in the first embodiment. When the sampling data falls within the normal range, the brake ECU 100 determines in step S21 that the activation of the pressure-increasing device 50 is normal, and when the sampling data is outside the normal range, the brake ECU 100 determines in step S22 that the activation of the pressure-increasing device 50 is abnormal. The brake ECU 100 stores the result of this activation check of the pressure-increasing device 50 into the non-volatile memory, and then, ends the activation check routine.

The above-mentioned brake control device according to the second embodiment includes the pilot input passage 37, adjusts the hydraulic pressure outputted from the power hydraulic pressure generating device 30 to the activation check hydraulic pressure by the pilot pressure adjusting linear control valve 96, and supplies the adjusted hydraulic pressure to the pilot unit 53 of the pressure-increasing device 50. This configuration can implement the activation check of the pressure-increasing device 50 without relying on the driver's operation on the brake pedal. Since the pilot pressure is controlled by using the pilot pressure adjusting linear control valve 96, the activation check can accurately be performed. In addition, the activation check can be performed without relying on the driver's operation on the brake pedal, whereby a degree of freedom of a check timing is increased. In addition, the brake actuator 400 according to the second embodiment is configured to prevent the output unit of the main pressure-increasing linear control valve 91 supplying hydraulic pressure to the common passage 92 from communicating with the pilot unit 53 of the pressure-increasing device 50. Therefore, when an abnormal leakage of operating fluid is detected, braking force can be generated in such a manner that the rear wheel accumulator brake system that supplies a control hydraulic pressure to the wheel cylinders 82RL and 82RR for the rear wheels and two master brake systems for the front wheels can be independent from each other.

The servo pressure passage 41 joins the downstream passage of the main pressure-increasing linear control valve 91, whereby the pilot pressure adjusting linear control valve 96 can be used for the hydraulic control for the wheel cylinders of four wheels. Accordingly, the activation of the main pressure-increasing linear control valve 91 can be assisted. The configuration in which the main pressure-increasing linear control valve 91 and the pilot pressure adjusting linear control valve 96 are alternately activated can shorten the activation time of the main pressure-increasing linear control valve 91, whereby the life of the main pressure-increasing linear control valve 91 can be prolonged. The configuration in which the main pressure-increasing linear control valve 91 and the pilot pressure adjusting linear control valve 96 are simultaneously activated can increase the flow rate of the operating fluid that can be flown through the common passage 92, whereby the individual main pressure-increasing linear control valve 91 and the pilot pressure adjusting linear control valve 96 can be formed as a type for a small flow rate. When it is configured such that the hydraulic control for four wheels is performed by the pilot pressure adjusting linear control valve 96 instead of the main pressure-increasing linear control valve 91 in the case where the main pressure-increasing linear control valve 91 is in failure, the capability to cope with failure can be enhanced.

While the vehicle brake control device according to the embodiments of the present invention has been described, the present invention is not limited to the above embodiments, and various modifications are possible without departing from the spirit of the invention.

For example, in the first embodiment described above, the hydraulic supply passage that supplies a control hydraulic pressure to the wheel cylinder 82FL of the front-left wheel is used as the pilot input passage 37. However, the hydraulic supply passage for the wheel cylinders 82 of other wheels may be used. In this case, the hydraulic supply passage for either one of the wheel cylinders 82FL and 82FR of the front wheels is desirably used. If the hydraulic supply passage for the wheel cylinder 82FR for the front-right wheel is used as the pilot input passage 37 of the pressure-increasing device 50, for example, the servo pressure can be supplied to the wheel cylinders 82FL and 82FR for the left and right front wheels as in the above embodiments. In this case, the servo pressure passage 41 may be connected to the individual passage 43FR for the front-right wheel, and the second master passage 24 may be connected to the individual passage 43FL for the front-left wheel. Similarly, in the second embodiment, the servo pressure passage 41 may be connected to the wheel cylinder 82FR for the front-right wheel. In this case, the second master passage 24 may be connected to the individual passage 43FL for the front-left wheel.

In the above two embodiments, whether the pressure-increasing device 50 is normally activated or not is determined based on the relationship between the current flowing through the pressure-increasing linear control valve 44FL (the pilot pressure adjusting linear control valve 96 in the second embodiment) and the servo pressure that is the hydraulic pressure outputted from the pressure-increasing device 50 upon the activation check. However, it may be determined based on the relationship between the pilot pressure and the servo pressure, since the current flowing through the solenoid of the linear control valve and the hydraulic pressure at the output side of the linear control valve have a certain relationship. In this case, a hydraulic pressure sensor may be provided to the portion having a pressure equal to the pressure of the pilot unit 32, and the activation check may be performed based on the relationship between the pilot pressure detected by this hydraulic pressure sensor and the servo pressure detected by the wheel cylinder pressure sensor 69FL (the control pressure sensor 98 in the second embodiment).

In the above two embodiments, the current flowing through the pressure-increasing linear control valve 44FL (the pilot pressure adjusting linear control valve 96 in the second embodiment) increases, and the change in the servo pressure during the increase is sampled. However, the change in the servo pressure may be sampled, while decreasing the current flowing through the pressure-increasing linear control valve 44FL (the pilot pressure adjusting linear control valve 96 in the second embodiment) from an initial current value larger than an activation start current. Plural sampling data pieces are not always necessarily acquired, and the activation check may be performed based on whether the servo pressure at the time at which an activation check set current (fixed value) larger than the activation start current is flown through the pressure-increasing linear control valve 44FL (pilot pressure adjusting linear control valve 96) falls within a normal range or not.

In the above two embodiments, the servo pressure that is the hydraulic pressure outputted form the pressure-increasing device 50 is supplied to two wheel cylinders 82. However, the servo pressure may be supplied to one wheel cylinder 82, or to three or four wheel cylinders 82. In addition, plural pressure-increasing devices 50 may be provided.

The above two embodiments describe a brake control device for a four-wheel automobile. However, the embodiments can be applied to an automobile other than a four-wheel automobile. For example, a servo pressure may be supplied only to wheel cylinders for any wheels (e.g., front wheel) of a three-wheel automobile having one front wheel and two rear wheels.

In the above two embodiments, the accumulator pressure is adjusted by the linear control valve, and the activation check pilot pressure is supplied to the pressure-increasing device. However, the pilot pressure is not necessarily adjusted by using the linear control valve. A pressure adjusting valve that adjusts an accumulator pressure to an activation check hydraulic pressure (fixed pressure) set beforehand can be used, for example.

The invention claimed is:

1. A vehicle brake control device comprising:
   a wheel cylinder provided to each of plural wheels, and receiving a hydraulic pressure of operating fluid to apply braking force to the wheels;
   a pedal effort hydraulic pressure generating device that generates a hydraulic pressure by a pedal effort caused by a driver's depression operation on a brake pedal;
   a power hydraulic pressure generating device that generates a hydraulic pressure by driving an electric pressure applying device;
   a pressure adjusting device that adjusts a hydraulic pressure outputted from the power hydraulic pressure generating device, and supplies the adjusted hydraulic pressure to each of the wheel cylinders;
   a hydraulic control unit that controls an activation of the pressure adjusting device;
   a pressure-increasing device that is a pilot hydraulic controller activating without using electric energy, and includes a pilot unit receiving a hydraulic pressure outputted from the pedal effort hydraulic pressure generating device, the pressure-increasing device is to output a hydraulic pressure higher than the hydraulic pressure outputted from the pedal effort hydraulic pressure generating device by utilizing the hydraulic pressure outputted from the power hydraulic pressure generating device;

a servo pressure passage that is a passage to supply a hydraulic pressure outputted from the pressure-increasing device to at least one of the wheel cylinders; and an activation check unit that determines whether the pressure-increasing device is activated without an abnormality or not, the vehicle brake control device further comprising:

a check pilot pressure supply unit that adjusts the hydraulic pressure outputted from the power hydraulic pressure generating device to an activation check hydraulic pressure, and supplies the activation check hydraulic pressure to the pilot unit of the pressure-increasing device, wherein the activation check unit determines whether the pressure-increasing device is activated without the abnormality or not based on the hydraulic pressure outputted from the pressure-increasing device when the activation check hydraulic pressure is supplied to the pilot unit of the pressure-increasing device by the check pilot pressure supply unit, and the check pilot pressure supply unit includes:

a power hydraulic pressure pilot input passage that is a passage to supply a hydraulic pressure from the power hydraulic pressure generating device to the pilot unit of the pressure-increasing device; and a linear control valve that adjusts the hydraulic pressure outputted from the power hydraulic pressure generating device to the activation check hydraulic pressure.

2. A vehicle brake control device according to claim 1, further comprising:

a bypass passage that supplies a hydraulic pressure outputted from the linear control valve provided on the power hydraulic pressure pilot input passage to the servo pressure passage by bypassing the pressure-increasing device; and an activation restriction unit that brings the pressure-increasing device into a disabled state, wherein the hydraulic control unit controls the linear control valve provided on the power hydraulic pressure pilot input passage to supply the hydraulic pressure adjusted by the linear control valve to at least one of the wheel cylinders via the bypass passage or the servo pressure passage, when the pressure-increasing device is in the disabled state.

3. A vehicle brake control device according to claim 1, wherein the servo pressure passage joins a downstream passage of the pressure adjusting device.

4. A vehicle brake control device according to claim 1, wherein a first wheel cylinder of the wheel cylinders being of one of left and right front wheels and a second wheel cylinder of the wheel cylinders being of the other of the left and right front wheels, and the first and second wheel cylinders communicate with each other via a normally opened on-off valve that is closed when its solenoid is energized, and that keeps opened when its solenoid is not energized, and the servo pressure passage supplies a hydraulic pressure to the first or second wheel cylinder of one of the left and right front wheels.

5. A vehicle brake control device comprising:

a wheel cylinder provided to each of plural wheels, and receiving a hydraulic pressure of operating fluid to apply braking force to the wheels;

a pedal effort hydraulic pressure generating device that generates a hydraulic pressure by a pedal effort caused by a driver's depression operation on a brake pedal;

a power hydraulic pressure generating device that generates a hydraulic pressure by driving an electric pressure applying device;

a pressure adjusting device that adjusts a hydraulic pressure outputted from the power hydraulic pressure generating device, and supplies the adjusted hydraulic pressure to each of the wheel cylinders;

circuitry configured to control an activation of the pressure adjusting device;

a pressure-increasing device that is a pilot hydraulic controller activating without using electric energy, and includes a pilot mechanism receiving a hydraulic pressure outputted from the pedal effort hydraulic pressure generating device, the pressure-increasing device is to output a hydraulic pressure higher than the hydraulic pressure outputted from the pedal effort hydraulic pressure generating device by utilizing the hydraulic pressure outputted from the power hydraulic pressure generating device; and a servo pressure passage that is a passage to supply a hydraulic pressure outputted from the pressure-increasing device to at least one of the wheel cylinders, the circuitry is configured to determine whether the pressure-increasing device is activated without an abnormality or not, the vehicle brake control device further comprising:

a check pilot pressure supply mechanism that adjusts the hydraulic pressure outputted from the power hydraulic pressure generating device to an activation check hydraulic pressure, and supplies the activation check hydraulic pressure to the pilot mechanism of the pressure-increasing device, wherein the circuitry is configured to determine whether the pressure-increasing device is activated without the abnormality or not based on the hydraulic pressure outputted from the pressure-increasing device when the activation check hydraulic pressure is supplied to the pilot mechanism of the pressure-increasing device by the check pilot pressure supply mechanism, and the check pilot pressure supply mechanism includes:

a power hydraulic pressure pilot input passage that is a passage to supply a hydraulic pressure from the power hydraulic pressure generating device to the pilot mechanism of the pressure-increasing device; and a linear control valve that adjusts the hydraulic pressure outputted from the power hydraulic pressure generating device to the activation check hydraulic pressure.

6. A vehicle brake control device according to claim 5, further comprising:

a bypass passage that supplies a hydraulic pressure outputted from the linear control valve provided on the power hydraulic pressure pilot input passage to the servo pressure passage by bypassing the pressure-increasing device; and an activation restriction mechanism that brings the pressure-increasing device into a disabled state, wherein the circuitry is configured to control the linear control valve provided on the power hydraulic pressure pilot input passage to supply the hydraulic pressure adjusted by the linear control valve to at least one of the wheel cylinders via the bypass passage or the servo pressure passage, when the pressure-increasing device is in the disabled state.

7. A vehicle brake control device according to claim 5, wherein
the servo pressure passage joins a downstream passage of the pressure adjusting device.

8. A vehicle brake control device according to claim 5, wherein
a first wheel cylinder of the wheel cylinders being of one of left and right front wheels and a second wheel cylinder of the wheel cylinders being of the other of the left and right front wheels, and the first and second wheel cylinders communicate with each other via a normally opened on-off valve that is closed when its solenoid is energized, and that keeps opened when its solenoid is not energized, and
the servo pressure passage supplies a hydraulic pressure to the first or second wheel cylinder of one of the left and right front wheels.

\* \* \* \* \*